(12) United States Patent
Kumar et al.

(10) Patent No.: US 12,519,591 B2
(45) Date of Patent: Jan. 6, 2026

(54) DYNAMIC ADDITIONAL DEMODULATION REFERENCE SIGNAL CONFIGURATION

(71) Applicant: Dell Products L.P., Round Rock, TX (US)

(72) Inventors: Sunil Kumar, Bangalore (IN); Mudit Gupta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 626 days.

(21) Appl. No.: 17/812,271

(22) Filed: Jul. 13, 2022

(65) Prior Publication Data

US 2024/0022374 A1 Jan. 18, 2024

(51) Int. Cl.
*H04L 5/00* (2006.01)
*H04W 76/10* (2018.01)

(52) U.S. Cl.
CPC ........... *H04L 5/0051* (2013.01); *H04W 76/10* (2018.02)

(58) Field of Classification Search
CPC .............................. H04L 5/0051; H04W 76/10
See application file for complete search history.

(56) References Cited

U.S. PATENT DOCUMENTS

| 11,336,419 | B2 | 5/2022 | Wang et al. |
| 12,323,356 | B2 | 6/2025 | Kumar et al. |
| 2015/0304080 | A1 | 10/2015 | Yi et al. |
| 2016/0127932 | A1 | 5/2016 | Cosimini et al. |
| 2016/0212737 | A1 | 7/2016 | Jang et al. |
| 2018/0270103 | A1 | 9/2018 | Chapman et al. |
| 2019/0223176 | A1 | 7/2019 | Liu et al. |
| 2019/0349023 | A1 | 11/2019 | Ge et al. |
| 2020/0052802 | A1 | 2/2020 | Ryu et al. |

(Continued)

FOREIGN PATENT DOCUMENTS

| WO | 2018229955 | 12/2018 |
| WO | 2019/032296 | 2/2019 |

(Continued)

OTHER PUBLICATIONS

Office Action mailed Nov. 19, 2024 for U.S. Appl. No. 17/812,262, 44 pages.

(Continued)

*Primary Examiner* — Joseph E Dean, Jr.
(74) *Attorney, Agent, or Firm* — Amin, Turocy & Watson, LLP

(57) ABSTRACT

A system can configure a first number of demodulation reference signal positions in radio resource control information as part of a connection setup with a user equipment that is configured to facilitate first broadband cellular communications. The system can, after attaching the user equipment, send, to the user equipment, a medium access control control element message indicative of modifying the first number of demodulation reference signal positions to a second number of demodulation reference signal positions. The system can conduct second broadband cellular communications with the user equipment according to the second number of demodulation reference signal positions, wherein a throughput of the second broadband cellular communications is determined as a function of a size of a transport block set based on the second number of demodulation reference signal positions.

20 Claims, 20 Drawing Sheets

(56) References Cited

U.S. PATENT DOCUMENTS

| | | | |
|---|---|---|---|
| 2020/0229185 | A1 | 7/2020 | Zhang et al. |
| 2020/0314960 | A1 | 10/2020 | Basu Mallick et al. |
| 2020/0328861 | A1 | 10/2020 | Malladi et al. |
| 2021/0075571 | A1 | 3/2021 | Manolakos et al. |
| 2021/0153171 | A1 | 5/2021 | Saito et al. |
| 2021/0250753 | A1 | 8/2021 | Hosseini et al. |
| 2022/0078872 | A1 | 3/2022 | Shrestha et al. |
| 2022/0123853 | A1 | 4/2022 | Chandran et al. |
| 2022/0159757 | A1 | 5/2022 | Balasubramanian et al. |
| 2022/0166566 | A1 | 5/2022 | Kumar et al. |
| 2022/0286253 | A1 | 9/2022 | Chae et al. |
| 2023/0006762 | A1 | 1/2023 | Levitsky et al. |
| 2023/0164702 | A1 | 5/2023 | Lee et al. |
| 2023/0216711 | A1 | 7/2023 | Yao et al. |
| 2023/0353306 | A1 | 11/2023 | Ren et al. |
| 2023/0371030 | A1 | 11/2023 | Wang et al. |
| 2023/0379926 | A1 | 11/2023 | Pardhasarathy et al. |
| 2023/0379927 | A1 | 11/2023 | Agarwal et al. |
| 2023/0379930 | A1 | 11/2023 | Chacko et al. |
| 2024/0187182 | A1 | 6/2024 | Shukla et al. |

FOREIGN PATENT DOCUMENTS

| | | | | |
|---|---|---|---|---|
| WO | 2021/243481 | | 12/2021 | |
| WO | WO-2021243481 A1 | * | 12/2021 | ............ H04L 5/0051 |
| WO | 2022/031919 | | 2/2022 | |
| WO | 2023/048330 | | 3/2023 | |

OTHER PUBLICATIONS

Final Office Action mailed Feb. 18, 2025 for U.S. Appl. No. 17/812,261, 50 pages.
Office Action mailed Aug. 15, 2024 for U.S. Appl. No. 17/812,261, 53 pages.
Office Action mailed Oct. 24, 2024 for U.S. Appl. No. 17/812,265, 46 pages.
International Search Report and Written Opinion mailed Apr. 19, 2024 for PCT Application No. PCT/US2023/035945, 17 pages.
Moderator (Huawei): "Summary#I of efficient SCe11 activation/deactivation mechanism of NR CA", 3GPP Draft; R1-2103886, Ran WG1, No. E-meeting; Apr. 20, 2021, [https://ftp.3gpp.org/tsg_ran/WG1_RL1/TSGR1_104b-e/Inbox/R1-2103886.zip R1-2103886 Sumniary#2 of SCe11 activation of NR CA.docx], 43 pages.
International Search Report and Written Opinion mailed Feb. 13, 2024 for PCT Application No. PCT/US2023/035946, 14 pages.
International Search Report and Written Opinion mailed Feb. 26, 2024 for PCT Application No. PCT/US2023/035950, 19 pages.
International Search Report and Written Opinion mailed Mar. 1, 2024 for PCT Application No. PCT/US2023/036165, 19 pages.
Kumar et al. "Dynamic Additional Demodulation Reference Signal Configuration" U.S. Appl. No. 17/812,261, filed Jul. 13, 2022, 64 pages.
Kumar et al. "Dynamic Additional Demodulation Reference Signal Configuration" U.S. Appl. No. 17/812,265, filed Jul. 13, 2022, 62 pages.
Kumar et al. "Dynamic Additional Demodulation Reference Signal Configuration" U.S. Appl. No. 17/812,262, filed Jul. 13, 2022, 62 pages.
Kumar, Sunil. "Dynamic Additional Demodulation Reference Signal Configuration" U.S. Appl. No. 18/063,347, filed Dec. 8, 2022, 74 pages.
Kumar, Sunil. "Dynamic Additional Demodulation Reference Signal Configuration" U.S. Appl. No. 18/063,357, filed Dec. 8, 2022, 73 pages.
Kumar, Sunil. "Dynamic Additional Demodulation Reference Signal Configuration" U.S. Appl. No. 18/068,261, filed Dec. 19, 2022, 69 pages.
Kumar, Sunil. "Dynamic Additional Demodulation Reference Signal Configuration" U.S. Appl. No. 18/068,737, filed Dec. 20, 2022, 68 pages.
Notice of Allowance mailed May 5, 2025 for U.S. Appl. No. 18/068,737, 40 pages.
Office Action mailed Mar. 24, 2025 for U.S. Appl. No. 18/063,347, 43 pages.
Office Action mailed Apr. 3, 2025 for U.S. Appl. No. 18/063,357, 66 pages.
Notice of Allowance mailed Feb. 26, 2025 for U.S. Appl. No. 17/812,262, 22 pages.
Notification concerning transmittal of copy of International Preliminary Report on Patentability mailed Jun. 19, 2025 for PCT Application No. PCT/US2023/035945, 10 pages.
European Office Action mailed Jul. 15, 2025 for European Patent Application No. 23813121.3, 3 pages.
Notification concerning transmittal of copy of International Preliminary Report on Patentability mailed Jun. 19, 2025 for PCT Application No. PCT/US2023/035946, 9 pages.
European Office Action mailed Jul. 15, 2025 for European Patent Application No. 2309824.8, 3 pages.
Office Action mailed Jul. 9, 2025 for U.S. Appl. No. 18/068,261, 47 pages.
Notification concerning transmittal of copy of International Preliminary Report on Patentability mailed Jul. 3, 2025 for PCT Application No. PCT/US2023/035950, 14 pages.
Notification concerning transmittal of copy of International Preliminary Report on Patentability mailed Jul. 3, 2025 for PCT Application No. PCT/US2023/036165, 14 pages.
European Office Action mailed Jul. 29, 2025 for European Patent Application No. 23813122.1, 3 pages.
European Office Action mailed Jul. 29, 2025 for European Patent Application No. 23813147.8, 3 pages.
Notice of Allowance mailed Jul. 29, 2025 for U.S. Appl. No. 18/063,347, 24 pages.
Notice of Allowance mailed May 13, 2025 for U.S. Appl. No. 17/812,261, 34 pages.
Office Action mailed Sep. 24, 2025 for U.S. Appl. No. 17/812,265, 162 pages.
Office Action mailed Oct. 28, 2025 for U.S. Appl. No. 18/063,357, 82 pages.

* cited by examiner

100

```
-- ASN1START
-- TAG-DMRS-DOWNLINKCONFIG-START

DMRS-DownlinkConfig ::=         SEQUENCE {
    dmrs-Type                       ENUMERATED {type2}                      OPTIONAL,   -- Need S
    dmrs-AdditionalPosition         ENUMERATED {pos0, pos1, pos3}           OPTIONAL,   -- Need S
    maxLength                       ENUMERATED {len2}                       OPTIONAL,   -- Need S
    scramblingID0           102     INTEGER (0..65535)                      OPTIONAL,   -- Need S
    scramblingID1                   INTEGER (0..65535)                      OPTIONAL,   -- Need S
    phaseTrackingRS                 SetupRelease { PTRS-DownlinkConfig }    OPTIONAL,   -- Need M
    ...,
    [[
    dmrs-Downlink-r16               ENUMERATED {enabled}                    OPTIONAL,   -- Need R
    ]]
}

-- TAG-DMRS-DOWNLINKCONFIG-STOP
-- ASN1STOP
```

FIG. 1

```
-- ASN1START
-- TAG-DMRS-UPLINKCONFIG-START

DMRS-UplinkConfig ::=             SEQUENCE {
    dmrs-Type                         ENUMERATED {type2}                OPTIONAL,   -- Need S
    dmrs-AdditionalPosition           ENUMERATED {pos0, pos1, pos3}     OPTIONAL,   -- Need S
    phaseTrackingRS            202    SetupRelease { PTRS-UplinkConfig } OPTIONAL,  -- Need M
    maxLength                         ENUMERATED {len2}                 OPTIONAL,   -- Need S
    transformPrecodingDisabled        SEQUENCE {
        scramblingID0                     INTEGER (0..65535)            OPTIONAL,   -- Need S
        scramblingID1                     INTEGER (0..65535)            OPTIONAL,   -- Need S
        ...,
        [[
        dmrs-Uplink-r16                   ENUMERATED {enabled}          OPTIONAL    -- Need R
        ]]
    }                                                                   OPTIONAL,   -- Need R
}

-- TAG-DMRS-UPINKCONFIG-STOP
-- ASN1STOP
```

CONFIGURING A FIRST NUMBER OF DEMODULATION REFERENCE SIGNAL POSITIONS IN RADIO RESOURCE CONTROL INFORMATION AS PART OF A CONNECTION SETUP WITH A USER EQUIPMENT THAT IS CONFIGURED TO FACILITATE FIRST BROADBAND CELLULAR COMMUNICATIONS 1104

↓

AFTER ATTACHING THE USER EQUIPMENT, SENDING, TO THE USER EQUIPMENT, A MEDIUM ACCESS CONTROL CONTROL ELEMENT MESSAGE INDICATIVE OF MODIFYING THE FIRST NUMBER OF DEMODULATION REFERENCE SIGNAL POSITIONS TO A SECOND NUMBER OF DEMODULATION REFERENCE SIGNAL POSITIONS 1106

↓

CONDUCTING SECOND BROADBAND CELLULAR COMMUNICATIONS WITH THE USER EQUIPMENT ACCORDING TO THE SECOND NUMBER OF DEMODULATION REFERENCE SIGNAL POSITIONS, WHEREIN A THROUGHPUT OF THE SECOND BROADBAND CELLULAR COMMUNICATIONS IS DETERMINED AS A FUNCTION OF A SIZE OF A TRANSPORT BLOCK SET BASED ON THE SECOND NUMBER OF DEMODULATION REFERENCE SIGNAL POSITIONS 1108

AFTER ATTACHING A USER EQUIPMENT THAT IS CONFIGURED TO FACILITATE FIRST BROADBAND CELLULAR COMMUNICATIONS, SENDING AND TO THE USER EQUIPMENT, A MEDIUM ACCESS CONTROL CONTROL ELEMENT MESSAGE INDICATIVE OF A FIRST NUMBER OF DEMODULATION REFERENCE SIGNAL POSITIONS THAT WAS ESTABLISHED AS PART OF A CONNECTION SETUP BEING MODIFIED TO A SECOND NUMBER OF DEMODULATION REFERENCE SIGNAL POSITIONS 1204

↓

CONDUCTING BROADBAND CELLULAR COMMUNICATIONS WITH THE USER EQUIPMENT ACCORDING TO THE SECOND NUMBER OF DEMODULATION REFERENCE SIGNAL POSITIONS 1206

AFTER ATTACHING A USER EQUIPMENT THAT IS CONFIGURED TO FACILITATE FIRST BROADBAND CELLULAR COMMUNICATIONS, SENDING, TO THE USER EQUIPMENT, A MEDIUM ACCESS CONTROL CONTROL ELEMENT MESSAGE INDICATIVE OF A MODIFIED NUMBER OF DEMODULATION REFERENCE SIGNAL POSITIONS THAT WAS ESTABLISHED AS PART OF A CONNECTION SETUP 1304

↓

CONDUCTING BROADBAND CELLULAR COMMUNICATIONS WITH THE USER EQUIPMENT ACCORDING TO THE MODIFIED NUMBER OF DEMODULATION REFERENCE SIGNAL POSITIONS 1306

DYNAMIC ADDITIONAL DEMODULATION REFERENCE SIGNAL CONFIGURATION

BACKGROUND

In cellular broadband communications, a user equipment and a core network can communicate to configure a protocol to use in making further communications.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can configure a first number of demodulation reference signal positions in radio resource control information as part of a connection setup with a user equipment that is configured to facilitate first broadband cellular communications. The system can, after attaching the user equipment, send, to the user equipment, a medium access control control element message indicative of modifying the first number of demodulation reference signal positions to a second number of demodulation reference signal positions. The system can conduct second broadband cellular communications with the user equipment according to the second number of demodulation reference signal positions, wherein a throughput of the second broadband cellular communications is determined as a function of a size of a transport block set based on the second number of demodulation reference signal positions.

An example method can comprise, after attaching a user equipment that is configured to facilitate first broadband cellular communications, sending, by a system comprising a processor, and to the user equipment, a medium access control control element message indicative of a first number of demodulation reference signal positions that was established as part of a connection setup being modified to a second number of demodulation reference signal positions. The method can further comprise conducting, by the system, broadband cellular communications with the user equipment according to the second number of demodulation reference signal positions.

An example non-transitory computer-readable medium can comprise instructions that, in response to execution, cause a system comprising a processor to perform operations. These operations can comprise, after attaching a user equipment that is configured to facilitate first broadband cellular communications, sending, to the user equipment, a medium access control control element message indicative of a modified number of demodulation reference signal positions that was established as part of a connection setup. These operations can further comprise conducting broadband cellular communications with the user equipment according to the modified number of demodulation reference signal positions.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example demodulation reference signal (DMRS) downlink configuration information element that can facilitate dynamic additional DMRS configuration in accordance with an embodiment of this disclosure;

FIG. 2 illustrates an example DMRS uplink configuration information element that can facilitate dynamic additional DMRS configuration in accordance with an embodiment of this disclosure;

FIG. 11 illustrates an example process flow that can facilitate dynamic additional DMRS configuration, in accordance with an embodiment of this disclosure;

FIG. 12 illustrates another example process flow that can facilitate dynamic additional DMRS configuration, in accordance with an embodiment of this disclosure;

FIG. 13 illustrates another example process flow that can facilitate dynamic additional DMRS configuration, in accordance with an embodiment of this disclosure;

DETAILED DESCRIPTION

Figure 3A:
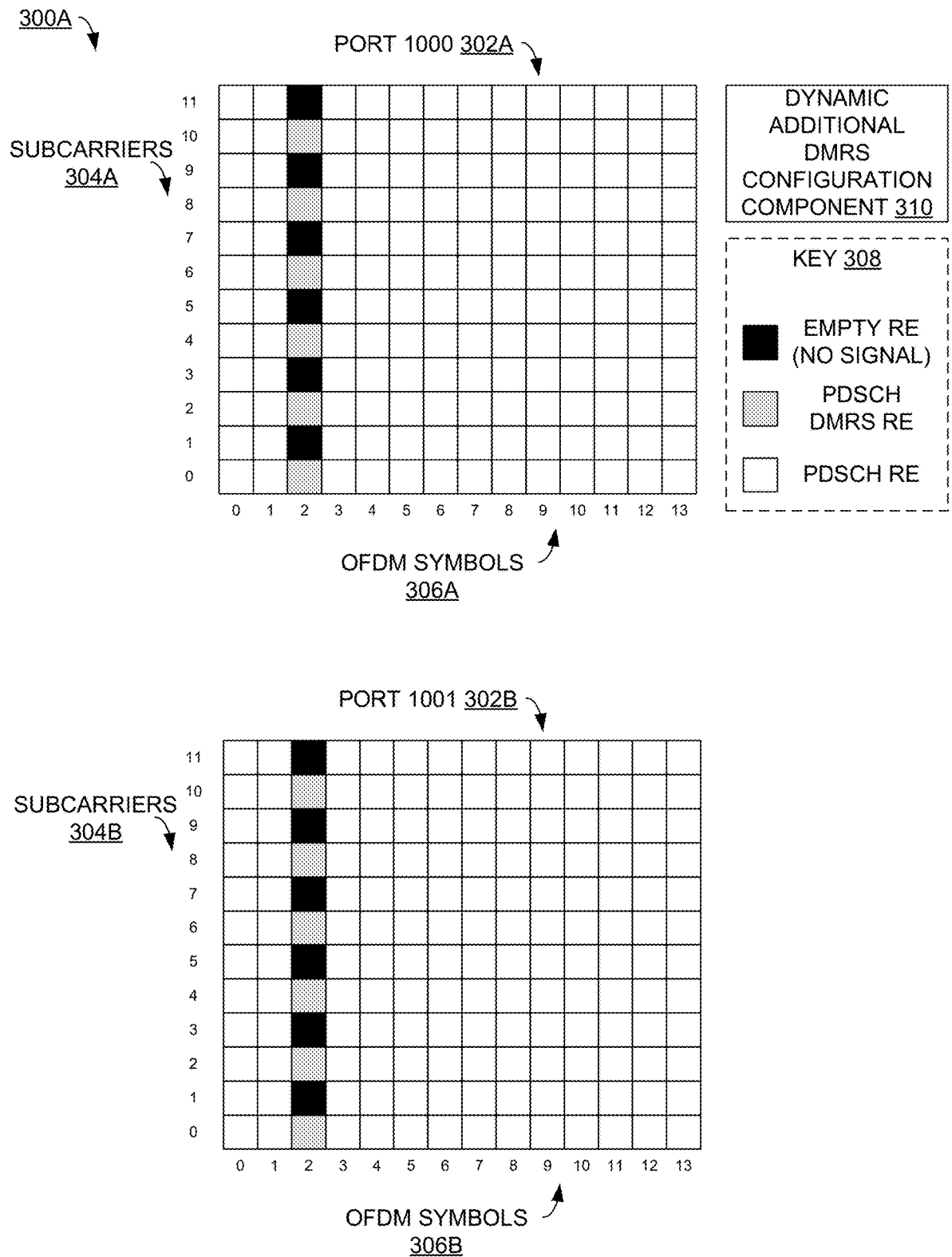
FIGS. 3A and 3B illustrate an example additional DMRS configuration that can facilitate dynamic additional DMRS configuration in accordance with an embodiment of this disclosure.

The examples described herein can generally relate to actions taken by a base station in communicating with a user equipment to dynamically configure additional demodulation reference signals. This dynamic configuration of additional demodulation reference signals can be established via a Medium Access Control Control Element (MAC-CE) message. In some examples, a MAC-CE message is sent at a MAC layer of cellular communications. Communications conducted at a MAC layer can be faster as compared to, for example, Radio Resource Control (RRC) layer communications.

In some examples of cellular communications, RRC and Non-access stratum (NAS) layer messages can be used to exchange signaling between a base station and user equipment. A MAC layer communication path can be another such path. In MAC layer communications, unique MAC structures can be defined that carry certain control information. In some examples, a unique MAC structure can be implemented to carry control information, and this structure can be referred to as a MAC-CE.

A MAC-CE can work between a base station (MAC) and a user equipment (MAC) for fast signaling communication exchange without involving higher communication layers.

It can be appreciated that corresponding actions can be taken by user equipment to also dynamically configure additional demodulation reference signals.

The examples herein generally relate to 5G cellular communications networks. It can be appreciated that the present techniques can be applied to other types of cellular communications networks for dynamically configuring additional demodulation reference signals (DMRSes).

A DMRS can be utilized by a 5G new radio (NR) receiver to produce channel estimates for demodulation of an associated physical channel A design and mapping of each DMRS can be specific to each 5G physical channel (e.g., physical broadcast channel (PBCH), physical downlink control channel (PDCCH), physical downlink shared channel (PDSCH), physical uplink control channel (PUSCH), and physical uplink shared channel (PUCCH)). DMRS can be user equipment (UE) specific, and be transmitted on demand In some examples, a DMRS does not extend outside of a scheduled physical resource of a channel it supports. DMRS can support massive multi-user multiple-input and multiple-output (MIMO). DMRS can be beamformed and, in some examples, support up to 12 orthogonal layers. A DMRS sequence for a cyclic-prefix orthogonal frequency division multiplexing (CP-OFDM) version can be quadrature phase shift keying (QPSK) based on Gold Sequences.

With respect to PDSCH, DMRS can comprise front-loaded DMRS symbols (e.g., either 1 or 2) that are located as follows:
1. Slot based (DMRS mapping type-A): This can be a fixed orthogonal frequency division multiplexing (OFDM) symbol regardless of PDSCH assignment and that is configurable between lo={2,3}.
2. Non-slot based (DMRS mapping type-B): This can be a first OFDM symbol assigned for PDSCH—e.g., mini slots.

In some examples, additional DMRS symbols can be configured in scenarios such as high-speed mobility (e.g., handover); when downlink (DL)/uplink (UL) block error ratio (BLER) is high, and UE-reported channel condition is poor; and when a UE is located on a cell edge, and, because of that, the UE is not able to decode or send DL and UL packets.

With regard to PUSCH DMRS, in an uplink, it can be that two waveform types are supported (e.g., CP-OFDM, and discrete Fourier transform-spread orthogonal frequency division multiplexing (DFT-S-OFDM)). A gold sequence can be used in CP-OFDM, and a Zadoff-Chu sequence can be used in DFT-S-OFDM. Front loaded DMRS symbols (e.g., either 1 or 2) can be located at a first OFDM symbol that is assigned for PUSCH.

The present techniques can be implemented to solve the following problems.

One problem that can be solved by implementing the present techniques can be when a 5G base station (sometimes referred to as gNodeB or gNB; or more generally a base station) includes an dmrs-AdditionalPosition information element (IE) using DMRS-DownlinkConfig and DMRS-UplinkConfig for downlink and uplink, respectively, during UE attach or another UE-specific procedure, then that configuration can stay with the UE during the lifetime of the scenario unless it is modified by a radio resource control (RRC) modification procedure.

A dmrs-AdditionalPosition IE for DL and UL is indicated in FIGS. 1 and 2, respectively. That is, FIG. 1 illustrates an example DMRS downlink configuration information element 100 that can facilitate dynamic additional DMRS configuration in accordance with an embodiment of this disclosure. In example DMRS downlink configuration information element 100, there is dmrs-AdditionalPosition 102.

And FIG. 2 illustrates an example DMRS uplink configuration information element 200 that can facilitate dynamic additional DMRS configuration in accordance with an embodiment of this disclosure. In In example DMRS uplink configuration information element 200, there is dmrs-AdditionalPosition 202.

Once this configuration is received by the UE, then the gNB and the UE can consider that configuration while determining a transport block (TB; which can generally determine data throughput of the UE). A TB can vary based on a number of additional DMRS positions that are configured.

Data throughput (TP) can be inversely proportional to a number of configured additional DMRS positions—that is, where more additional DMRS symbols are configured then there can be less data throughput.

Figure 3B:
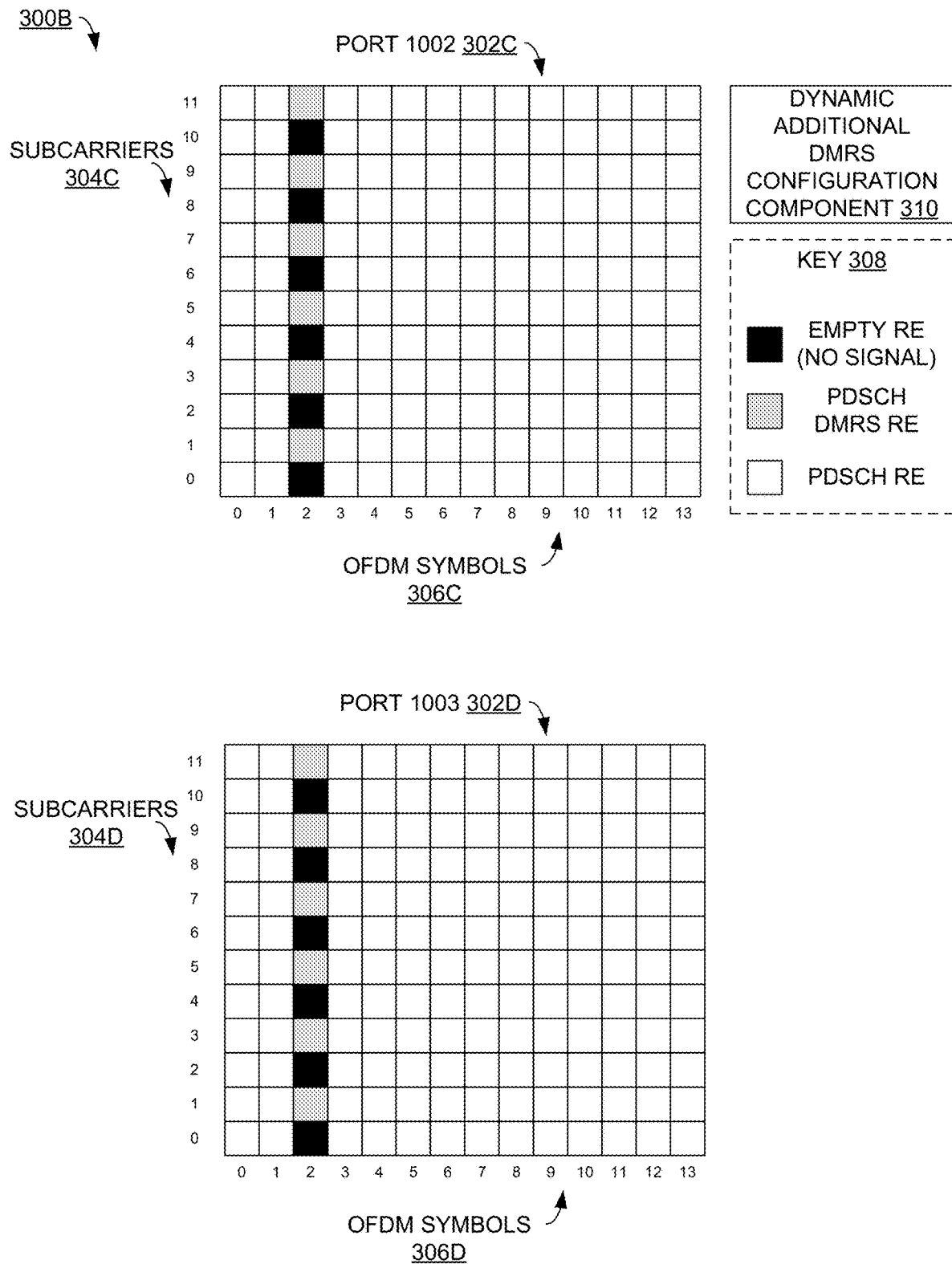

FIGS. 3A and 3B illustrate an example additional DMRS configuration 300A and 300B that can facilitate dynamic additional DMRS configuration in accordance with an embodiment of this disclosure. Example additional DMRS configuration 300A and 300B (as well as example additional DMRS configuration 400A and 400B of FIGS. 4A and 4B; example additional DMRS configuration 500A and 500B of FIGS. 5A and 5B; and example additional DMRS configuration 600A and 600B of FIGS. 6A and 6B) can have the following settings:
pdsch.NumLayers=4;
pdsch.MappingType='A';
pdsch.SymbolAllocation=[0 13]; % [startSymbol Length]
dmrs.DMRSconfigurationType=1;
dmrs.DMRSLength=1;
dmrs.DMRSTypeAPosition=2;
dmrs.NumCDMGroupsWithoutData=2;
dmrs.NIDNSCID=10;
dmrs.NSCID=0;

Additionally, example additional DMRS configuration 300A and 300B has "dmrs.DMRSAdditionalPosition=0;" which indicates that there are no additional DMRS positions configured. This configuration is illustrated in additional DMRS configuration 300A and 300B, which comprises port 1000 302A (with subcarriers 304A and OFDM symbols 306A); port 1001 302B (with subcarriers 304B and OFDM symbols 306B); port 1002 302C (with subcarriers 304C and OFDM symbols 306C); and port 1003 302D (with subcarriers 304D and OFDM symbols 306D).

Example additional DMRS configuration 300A and 300B also comprises dynamic additional DMRS configuration component 310 (which can comprise a computer component that implements the present techniques) and key 308. As depicted, FIGS. 3A and 3B relate to a 4-port antenna configuration, and dynamic additional DMRS configuration component 310 can comprise a 4-port dynamic additional DMRS configuration component.

Figure 4A:
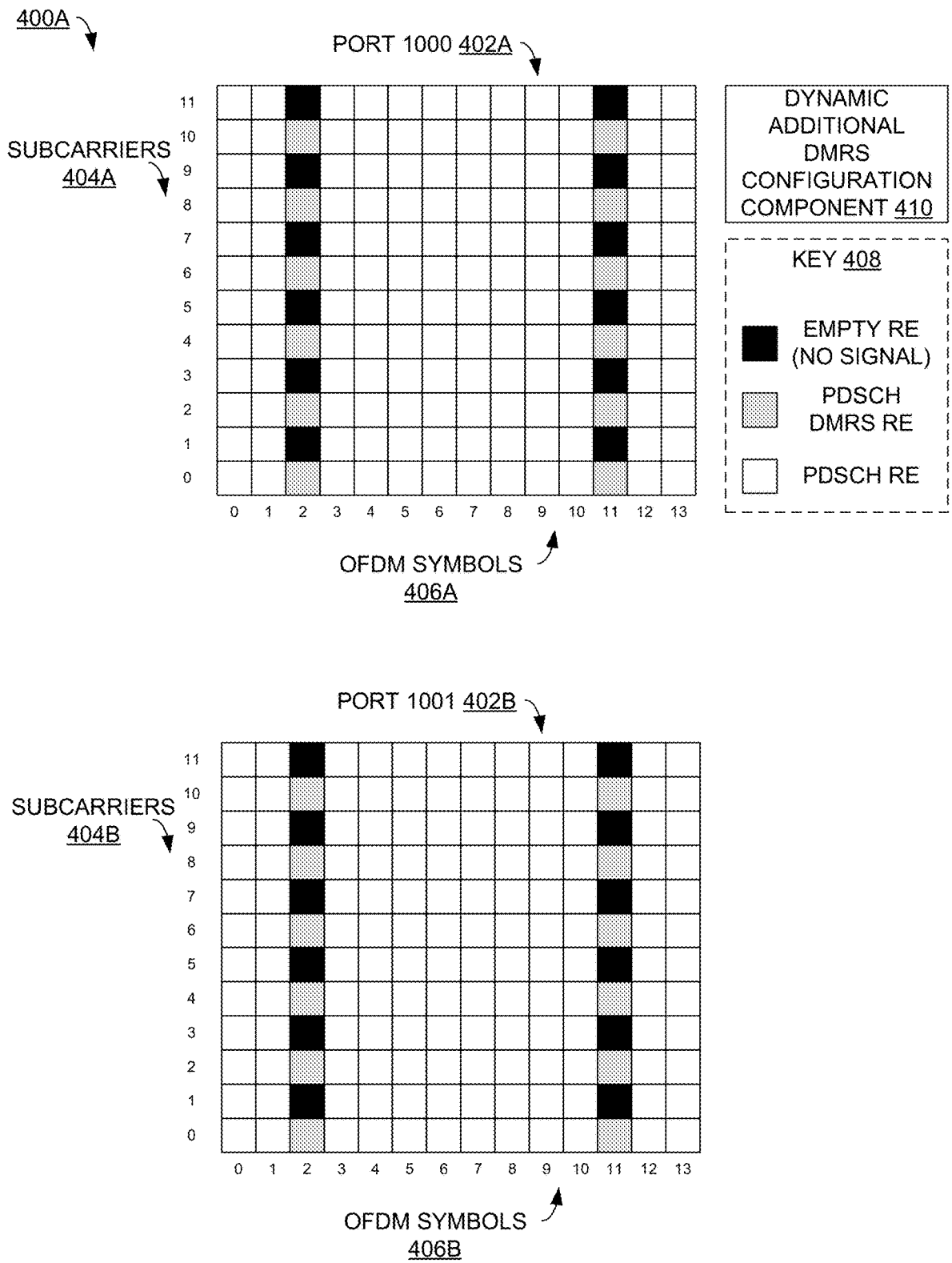
FIGS. 4A and 4B illustrate another example additional DMRS configuration that can facilitate dynamic additional DMRS configuration in accordance with an embodiment of this disclosure.
Figure 4B:
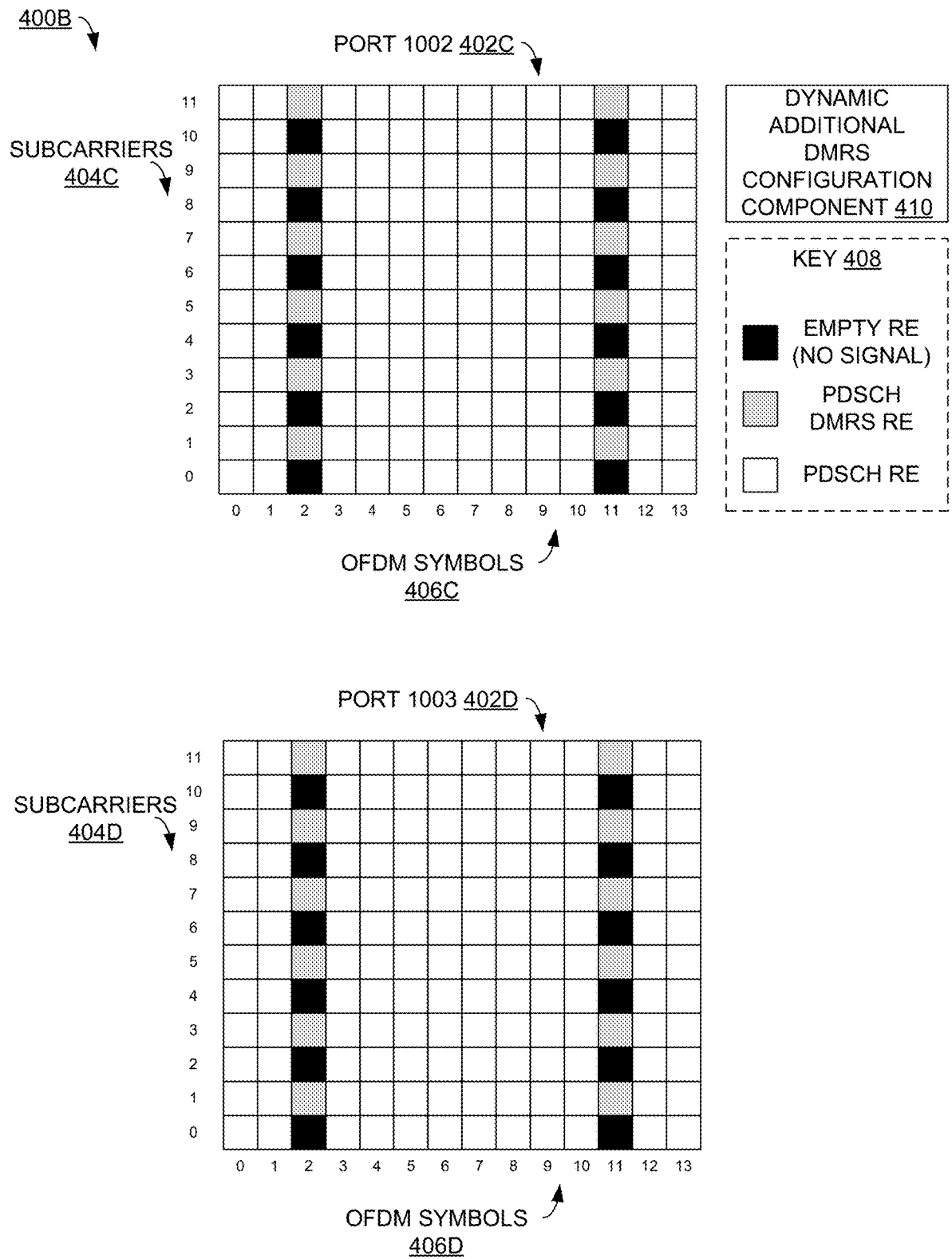

FIGS. 4A and 4B illustrate another example additional DMRS configuration 400A and 400B that can facilitate dynamic additional DMRS configuration in accordance with an embodiment of this disclosure.

Example additional DMRS configuration 400A and 400B has "dmrs.DMRSAdditionalPosition=1;" which indicates that there is one additional DMRS position configured. This configuration is illustrated in additional DMRS configuration 400A and 400B, which comprises port 1000 402A (with subcarriers 404A and OFDM symbols 406A); port 1001 402B (with subcarriers 404B and OFDM symbols 406B); port 1002 402C (with subcarriers 404C and OFDM symbols 406C); and port 1003 402D (with subcarriers 404D and OFDM symbols 406D).

Example additional DMRS configuration 400A and 400B also comprises dynamic additional DMRS configuration component 410 (which can comprise a computer component that implements the present techniques) and key 408.

Figure 5A:
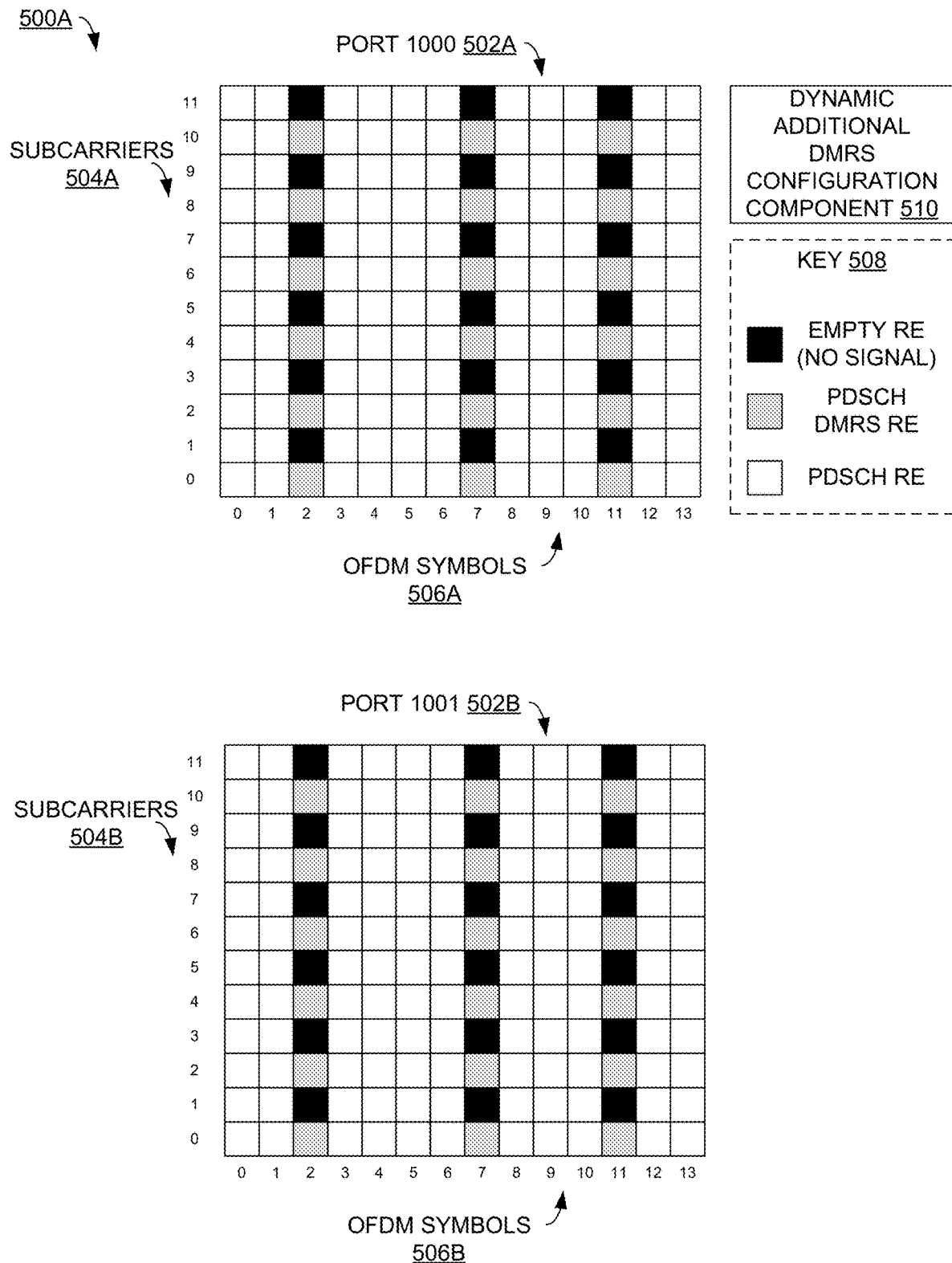
FIGS. 5A and 5B illustrate another example additional DMRS configuration that can facilitate dynamic additional DMRS configuration in accordance with an embodiment of this disclosure.
Figure 5B:
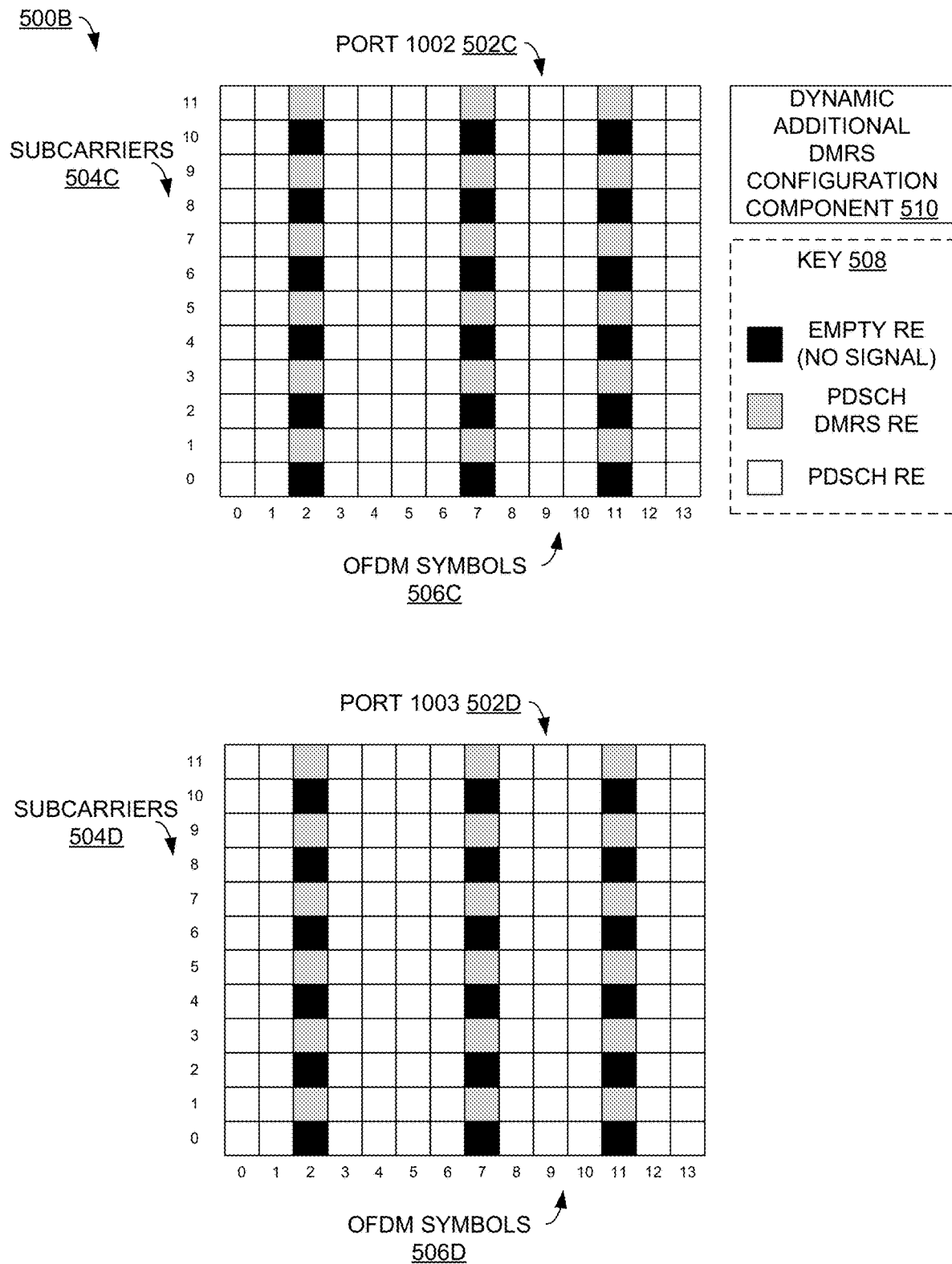

FIGS. 5A and 5B illustrate another example additional DMRS configuration 500A and 500B that can facilitate dynamic additional DMRS configuration in accordance with an embodiment of this disclosure.

Example additional DMRS configuration 500A and 500B has "dmrs.DMRSAdditionalPosition=2;" which indicates that there are two additional DMRS positions configured. This configuration is illustrated in additional DMRS configuration 500A and 500B, which comprises port 1000 502A (with subcarriers 504A and OFDM symbols 506A); port 1001 502B (with subcarriers 504B and OFDM symbols 506B); port 1002 502C (with subcarriers 504C and OFDM symbols 506C); and port 1003 502D (with subcarriers 504D and OFDM symbols 506D).

Example additional DMRS configuration 500A and 500B also comprises dynamic additional DMRS configuration component 510 (which can comprise a computer component that implements the present techniques) and key 508.

Figure 6A:
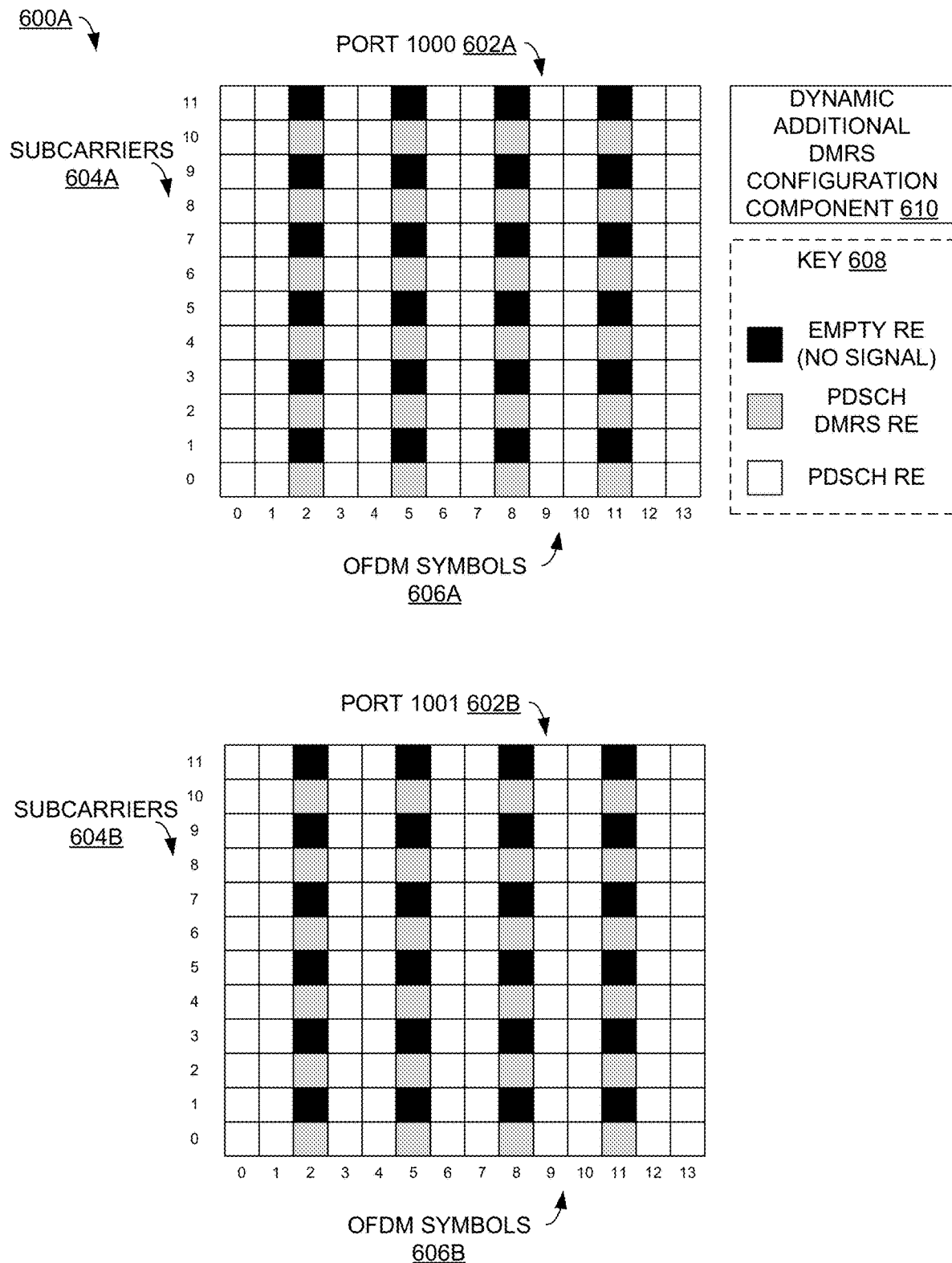
FIGS. 6A and 6B illustrate another example additional DMRS configuration that can facilitate dynamic additional DMRS configuration in accordance with an embodiment of this disclosure.
Figure 6B:
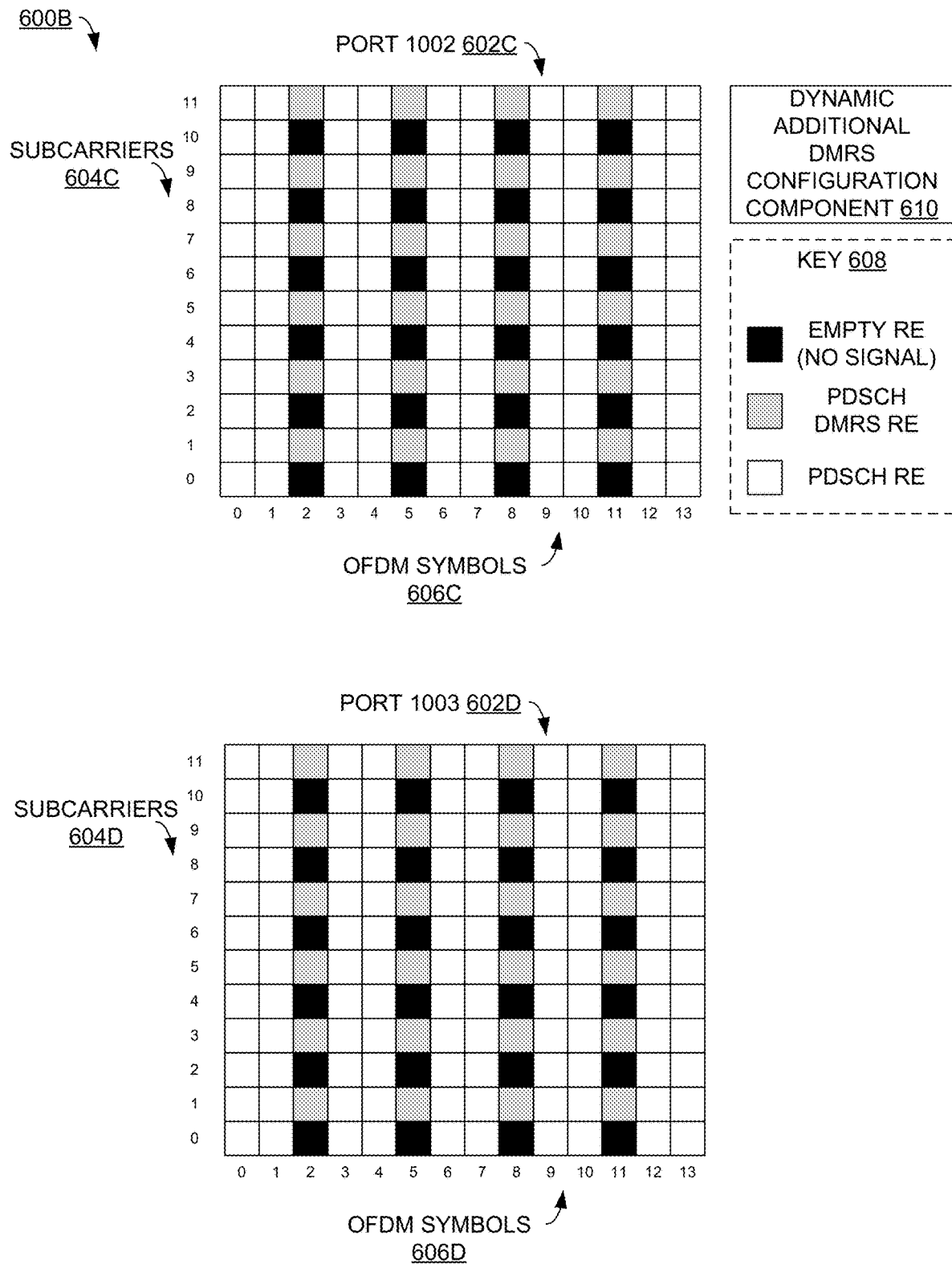

FIGS. 6A and 6B illustrate another example additional DMRS configuration 600A and 600B that can facilitate dynamic additional DMRS configuration in accordance with an embodiment of this disclosure.

Example additional DMRS configuration 600A and 600B has "dmrs.DMRSAdditionalPosition=3;" which indicates that there are three additional DMRS positions configured. This configuration is illustrated in additional DMRS configuration 600A and 600B, which comprises port 1000 602A (with subcarriers 604A and OFDM symbols 606A); port 1001 602B (with subcarriers 604B and OFDM symbols 606B); port 1002 602C (with subcarriers 604C and OFDM symbols 606C); and port 1003 602D (with subcarriers 604D and OFDM symbols 606D).

Example additional DMRS configuration 600A and 600B also comprises dynamic additional DMRS configuration component 610 (which can comprise a computer component that implements the present techniques) and key 608.

In the example of FIGS. 3A and 3B, there is no additional DMRS configured. In the example of FIGS. 4A and 4B, there is one additional DMRS symbol configured. In the example of FIGS. 5A and 5B, there are two additional DMRS symbols configured. In the example of FIGS. 6A and 6B, there are three additional DMRS symbols configured. So, in these examples, data throughput in FIGS. 3A and 3B can be greater than in FIGS. 4A and 4B, which can be greater than in FIGS. 5A and 5B, which can be greater than in FIGS. 6A and 6B.

As part of dynamically configuring additional DMRS positions, a component (e.g., dynamic additional DMRS configuration component 310 of FIGS. 3A and 3B) can dynamically switch between the configurations of FIGS. 4A and 4B, 5A and 5B, and 6A and 6B

One problem with additional DMRS configuration can be physical resource block (PRB) wastage because of an unnecessarily-configured higher additional DMRS position. Implementing the present techniques to dynamically change the additional DMRS position can be implemented to solve this problem.

Take an example where, during UE attach, a gNB configured an additional DMRS configuration in pos3 (indicating 3 additional DMRS symbols). Where radio/channel condition is good, where the UE is reporting a channel quality indicator (CQI), and UL and DL data BLER % are under 1% (indicating that a PDSCH and PUSCH packet decoding success rate is high), then having 3 symbols for additional DMRS can negatively impact data throughput.

Some prior approaches do not allow changing this configuration dynamically, and because of that, the gNB can be unnecessarily wasting a physical resource block.

Another problem with additional DMRS configuration can relate to frequent UE release, or a UE performing a RRC reestablishment procedure because channel condition is poor. Implementing the present techniques to dynamically change the additional DMRS position can be implemented to solve this problem.

Take an example where, during UE attach, the gNB has not configured an additional DMRS configuration in DL and or UL. Where radio/channel condition is poor, where the UE is reporting CQI and UL and DL BLER % is high (e.g., >20%, which can indicate that a success rate of decoding PDSCH and PUSCH packets is poor), it can be that the UE or gNB can perform a UE release or RRC reestablishment procedure. This procedure can take a long time to restore the connection. This problem can be avoided by dynamically configuring additional DMRS positions to sustain the connection. In some prior approaches, this configuration cannot be dynamically altered.

Another problem with additional DMRS configuration can relate to a high-speed mobility (handover) scenario. In a high-speed handover scenario, channel/radio condition can be kept on very frequently, to sustain and maintain good quality for a call. Additional DMRS symbols can be adapted dynamically based on reported CQI and BLER, to achieve good throughput, while also not compromising by wasting physical resources.

Another problem with additional DMRS configuration can relate to a scenario where a UE is located at a cell edge. It can be that, when a UE is located at a cell edge, the UE's channel quality is subpar, BLER % can be high. To improve this condition, a gNB can quickly adapt an additional DMRS configuration. It can be that adapting a DMRS configuration based on link adaptation is not supported by prior approaches.

The present techniques for dynamic additional DMRS configuration can be implemented as follows.

In some examples, an IE in UE capability for downlink and uplink can be implemented to support dynamic additional DMRS configuration. An IE ("dynamicAdditionalDMRS Support") for downlink can be implemented in FeatureSetDownlink. Where a UE supports this IE, it can mean that the UE supports dynamic additional DMRS configuration change in the downlink direction.

An IE ("dynamicAdditionalDMRSSupport") for uplink can be implemented in FeatureSetUplink. Where a UE supports this IE, it can mean that the UE supports dynamic additional DMRS configuration change in the uplink direction.

In some examples, an IE ("dynamicAdditionalDmrsSupport") can be implemented in PDSCH-Config for downlink, and in PUSCH-Config for uplink.

Figure 7:
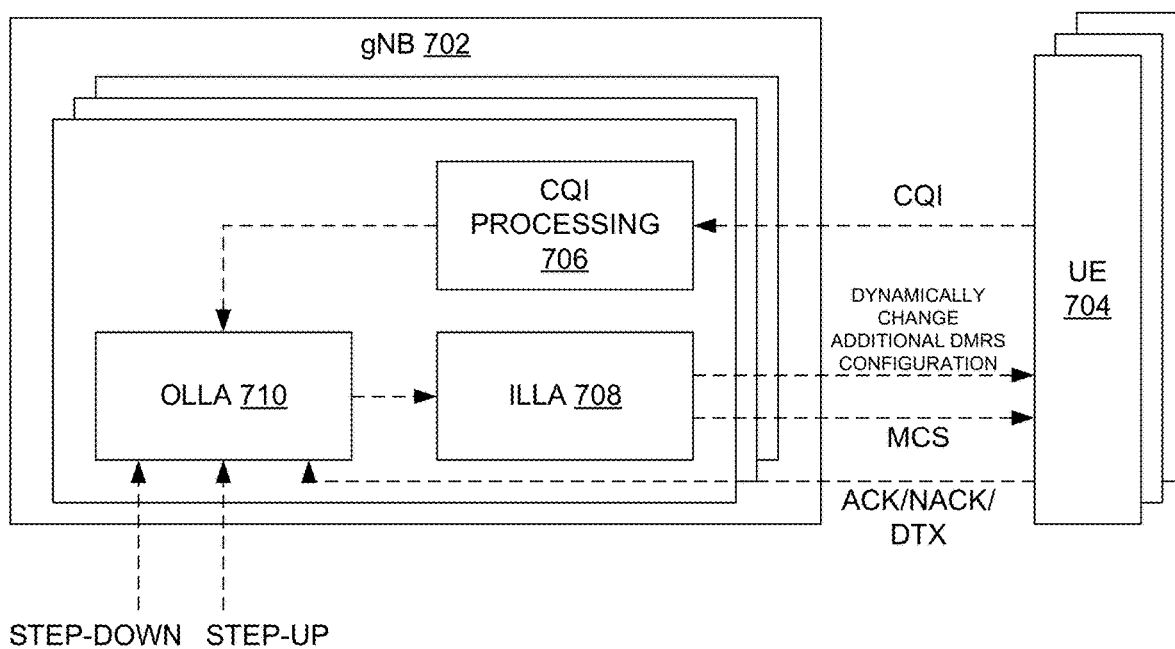
FIG. 7 illustrates an example system architecture that can facilitate dynamic additional DMRS configuration in accordance with an embodiment of this disclosure.

FIG. 7 illustrates an example system architecture 700 that can facilitate dynamic additional DMRS configuration in accordance with an embodiment of this disclosure. System architecture comprises gNB 702, UE 704, CQI processing 706, inner loop link adaptation (ILLA) 708, and gNB outer loop link adaptation (OLLA) 710 (which, in some examples, can more generally be a base station outer loop link adaptation).

In some examples, gNB 702 can determine additional DMRS information dynamically, as follows. As depicted in FIG. 7, where UE 704 is reporting channel quality using CQI, and hybrid automatic repeat request (HARQ) feedback (e.g., acknowledgment (ACK), negative acknowledgment (NACK), and discontinuous transmission (DTX)) for data transmission then, OLLA 710 can handle the HARQ feedback, and CQI processing 706 can handle CQI reported by UE 704.

Based on these two inputs, ILLA 708 can determine a modulation coding scheme (MCS) and additional DMRS position to be applied to UL and DL data transmission.

ILLA 708 can determine the MCS by considering the CQI reported by UE 704, and HARQ feedback. In some examples, the higher the MCS, the better the channel/radio quality, meaning a smaller number of additional DMRS positions configured to UE 704 using the present techniques.

Where ILLA 708 determines to use a lower MCS, meaning the channel quality reported by UE 704 is not good and BLER is high, this can mean that ILLA 708 determines to increase the additional DMRS position in DL/UL DCI to decrease the BLER %.

The following can be communicated as part of conveying capability of a UE. A FeatureSetCombination information element can be as follows:

```
-- ASN1START
-- TAG-FEATURESETCOMBINATION-START
FeatureSetCombination : :=                 SEQUENCE (SIZE
(1..maxSimultaneousBands) ) OF FeatureSetsPerBand
FeatureSetsPerBand : :=                    SEQUENCE (SIZE
(1..maxFeatureSetsPerBand) ) OF FeatureSet
FeatureSet : :=                            CHOICE {
    eutra                                  SEQUENCE {
        downlinkSetEUTRA                           FeatureSetEUTRA-
DownlinkId,
        uplinkSetEUTRA                             FeatureSetEUTRA-
UplinkId
    },
    nr                                     SEQUENCE {
        downlinkSetNR
FeatureSetDownlinkId,
        uplinkSetNR                                FeatureSetUplinkId
    }
}
-- TAG-FEATURESETCOMBINATION-STOP
-- ASN1STOP
```

An IE, FeatureSetDownlink, can indicate a set of features that a UE supports on carriers corresponding to one band entry in a band combination. A FeatureSetDownlink IE can be as follows:

```
-- ASN1START
-- TAG-FEATURESETDOWNLINK-START
FeatureSetDownlink : :=                                SEQUENCE {
    featureSetListPerDownlinkCC                        SEQUENCE (SIZE
(1..maxNrofServingCells) ) OF FeatureSetDownlinkPerCC-Id,
    intraBandFreqSeparationDL
FreqSeparationClass
OPTIONAL,
    scalingFactor                                      ENUMERATED
{f0p4, f0p75, f0p8}
OPTIONAL,
    crossCarrierScheduling-OtherSCS                    ENUMERATED
{supported}
OPTIONAL,
    scellWithoutSSB                                    ENUMERATED
{supported}
OPTIONAL,
    csi-RS-MeasSCellWithoutSSB                         ENUMERATED
{supported}
OPTIONAL,
    .....................
    -- An IE to indicate UE capability to support downlink
dynamic additional DMRS feature.
    dynamicAdditionalDMRSSupport                       ENUMERATED
{supported}
```

```
OPTIONAL,
.....................
    dummy1                              ENUMERATED
{supported}
OPTIONAL,
    dummy6                              SEQUENCE (SIZE
(1..maxNrofCodebooks) ) OF DummyD
OPTIONAL,
    dummy 7                             SEQUENCE (SIZE
(1..maxNrofCodebooks) ) OF DummyE
OPTIONAL
}
-- TAG-FEATURESETDOWNLINK-STOP
-- ASN1STOP
```

In a FeatureSetDownlink IE, a UE can set a dynamicAdditionalDMRS Support field to support where the UE is capable of supporting downlink additional DMRS features.

An IE, FeatureSetUplink, can indicate a set of features that a UE supports on carriers corresponding to one band entry in a band combination. A FeatureSetUplink IE can be as follows:

```
-- ASN1START
-- TAG-FEATURESETUPLINK-START
FeatureSetUplink : :=                   SEQUENCE {
    featureSetListPerUplinkCC           SEQUENCE (SIZE (1..
maxNrofServingCells) ) OF FeatureSetUplinkPerCC-Id,
    scalingFactor                       ENUMERATED {f0p4,
f0p75, f0p8}
OPTIONAL,
    crossCarrierScheduling-OtherSCS     ENUMERATED
{supported}
OPTIONAL,
    intraBandFreqSeparationUL           FreqSeparationClass
OPTIONAL,
    searchSpaceSharingCA-UL             ENUMERATED
{supported}
OPTIONAL,
        .....................
        -- An IE to indicate UE capability to support Uplink
dynamic additional DMRS feature.
    dynamicAdditionalDMRSSupport        ENUMERATED
{supported}
OPTIONAL,
        .....................
    dummy1                              DummyI
OPTIONAL,
    supportedSRS-Resources              SRS-Resources
OPTIONAL,
    twoPUCCH-Group                      ENUMERATED
{supported}
OPTIONAL,
    dynamicSwitchSUL                    ENUMERATED
{supported}
OPTIONAL,
    simultaneousTxSUL-NonSUL            ENUMERATED
{supported}
OPTIONAL,
        pusch-ProcessingType1-DifferentTB-PerSlot SEQUENCE {
            scs-15kHz                   ENUMERATED
{upto2, upto4, upto7}
OPTIONAL,
            scs-30kHz                   ENUMERATED
{upto2, upto4, upto7}
OPTIONAL,
            scs-60kHz                   ENUMERATED
{upto2, upto4, upto7}
OPTIONAL,
            scs-120kHz                  ENUMERATED
{upto2, upto4, upto7}
OPTIONAL
        }
```

```
OPTIONAL,
    dummy2                              DummyF
OPTIONAL
}
-- TAG-FEATURESETUPLINK-STOP
-- ASN1STOP
```

In a FeatureSetUplink IE, a UE can set a dynamicAdditionalDMRSSupport field to support where the UE is capable of supporting uplink additional DMRS features.

Figure 8:
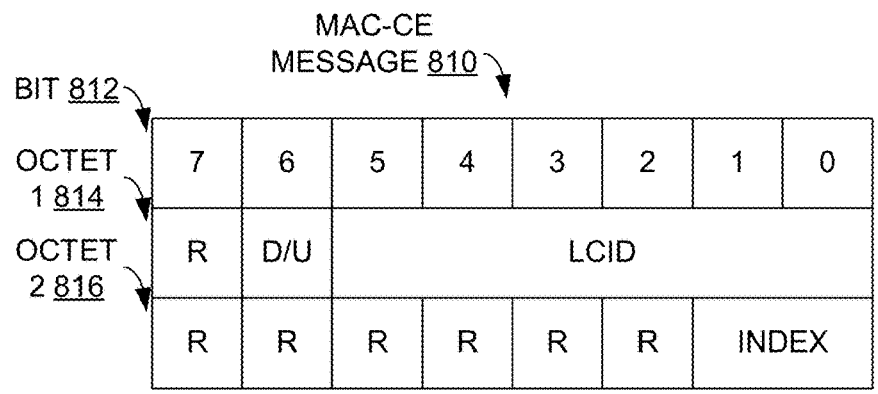
FIG. 8 illustrates an example Medium Access Control Control Element message format for activation/deactivation of additional DRMS information, and that can facilitate dynamic additional DMRS configuration in accordance with an embodiment of this disclosure.

FIG. 8 illustrates an example MAC-CE message format 800 for activation/deactivation of additional DRMS information, and that can facilitate dynamic additional DMRS configuration in accordance with an embodiment of this disclosure.

A MAC CE message can be sent between a base station (MAC) and user equipment (MAC) for fast signaling communication exchange, without involving upper layers.

A 3rd Generation Partnership Project (3GPP) protocol can give a provision to send control information using a MAC-CE message (or DCI). Activation and/or deactivation of DMRS using MAC-CE can be a one-time procedure. That is, it can take one-time physical resources for sending this CE.

Example MAC-CE message format 800 comprises MAC-CE message and Additional DMRS Position indication 820. In turn, MAC-CE message 810 can comprise bit 812, octet 1 814, and octet 2 816. Additional DMRS position indication 820 comprises index 822 and additional DMRS position 824.

In MAC-CE message 810, bit 812 indicates a bit number for octet 1 814 and octet 2 816. There are 8 bits, numbered 0-7. Octet 1 814 can store the following information: bit 7 can be reserved (R); bit 6 can store an identifier for direction (D being downlink, and U being uplink); bits 5-1 can store a logical channel identifier (LCID).

Octet 2 816 can store the following information: bits 7-2 can be reserved (R); and bits 1-0 can store additional DMRS position indication 820.

In additional DMRS position indication 820, index 822 indicates a value stored in bits 1-0 of octet 2 816, and additional DMRS position 824 indicates a corresponding number of additional DMRS positions.

There are four possible index values in index 822, and those four values can be expressed in binary in the two bits of bits 1-0 of octet 2 816.

FIG. 9 illustrates an example signal flow 900 for dynamic additional DMRS configuration for a downlink, and that can facilitate dynamic additional DMRS configuration in accordance with an embodiment of this disclosure. As depicted, in signal flow 900, communications are sent between user equipment 902, gNB 904, and 5G core (5GC) 906 (which comprises access and mobility management function (AMF) 908 and user plane function (UPF) 910).

The signal flow of signal flow 900 is an example signal flow, and there can be signal flows that implement different signals, or the signals of signal flow 900 in a different order, as part of facilitating dynamic additional DMRS configuration.

As depicted in signal flow 900, the following occurs:
5G-NR RRC connection setup 912
  Msg1:Preamble 914
    Allocate temporary Cell Radio Network Temporary Identifier (C-RNTI) 916

PDCCH DCI Format 1_0 [Random Access RNTI (RA_RNTI)] 918
Msg2:Random Access Response 920
Msg3:RRCSetupRequest 922
PDCCH DCI Format 1_0 [C_RNTI] 924
Msg4:RRCSetup 926, where a dynamicAdditionalDmrsSupport[TRUE/FALSE] IE is contained in this message, and can be added as part of the present techniques
PDCCH DCI Format 0_0 [C_RNTI] 928
RRCSetupComplete 930
AMF Selection 932
Initial UE message [Non-Access-Stratum-Protocol Data Unit (NAS-PDU):Registration Request] 934
NAS Identity Request/Response 936
NAS Authentication Request/Response 938
NAS Security Mode Command/Complete 940
UE capability enquiry 941A
UE capability information, with dynamicAdditionalDmrsSupport[Supported] IE in FeatureSetDownlink 941B
Initial Context Setup Request [NAS-PDU:Registration Accept] 942
RRCReconfiguration with dynamicAdditionalDmrsSupport=TRUE in PDSCH-Config IE where UE supports this feature in downlink 944 (which can indicate that the UE already supports a dynamic additional DMRS feature that is communicated by the UE in 941B as part of UE capability information; here, a gNB can add this IE in a RRCE Reconfiguration message)
RRCReconfigurationComplete 946
Initial Context Setup Response 948
Standalone (SA) UE attach procedure completed 950
Start downlink data transfer and channel quality reporting 952
Downlink data 954
Downlink data 956
PDCCH DCI Format 1_1 [C_RNTI] 958
Downlink Data [Medium Access Control (MAC) PDU contains PDSCH] 960
HARQ Feedback=ACK 962
Channel State Information (CSI) Report [CQI=15] 964
DL data decoding failed at UE 966
CSI Report [CQI=9, 7, 6, . . . ] 968
Channel condition gets worse 970
CSI Report [CQI=4, 5, 1, . . . ] 572
PDCCH DCI Format 1_1 [C_RNTI] 974
Downlink Data [MAC PDU contains PDSCH] 976
HARQ Feedback=NACK 978
HARQ Feedback=DTX 980
Trigger/change additional DMRS configuration using MAC-CE because condition met 982, where, in some examples, a condition can be CQI reporting is bad for a certain threshold and period; HARQ feedback is reported as NACK (e.g., BLER is high for a certain threshold and period); UE is on a cell edge; and/or UE is on high mobility
Downlink Data 984
Trigger activation/deactivation of additional DMRS information MAC-CE 986
HARQ Feedback=ACK for MAC-CE 988
Determine transport block (TB) for PDSCH by considering additional DMRS information 990
PDCCH DCI Format 1_1 [C_RNTI] 992
Downlink Data [MAC PDU contains PDSCH] 994
HARQ Feedback=ACK 996
Downlink data 998
Improvement seen in UE throughput for DL Data 999A
DL Data transfer continues 999B

Figure 10A:
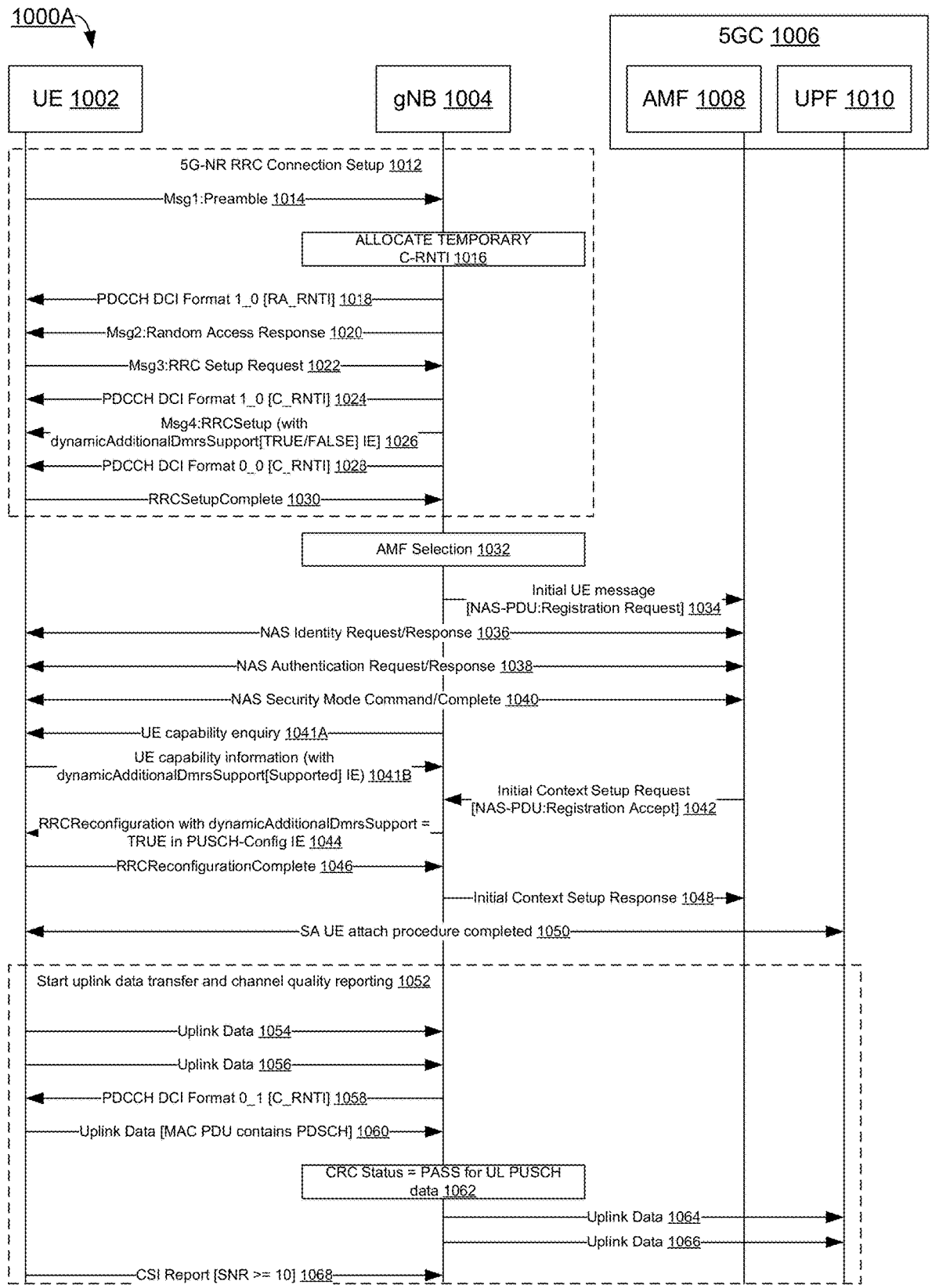
FIGS. 10A and 10B illustrates an example signal flow for dynamic additional DMRS configuration for a uplink, and that can facilitate dynamic additional DMRS configuration in accordance with an embodiment of this disclosure.
Figure 10B:
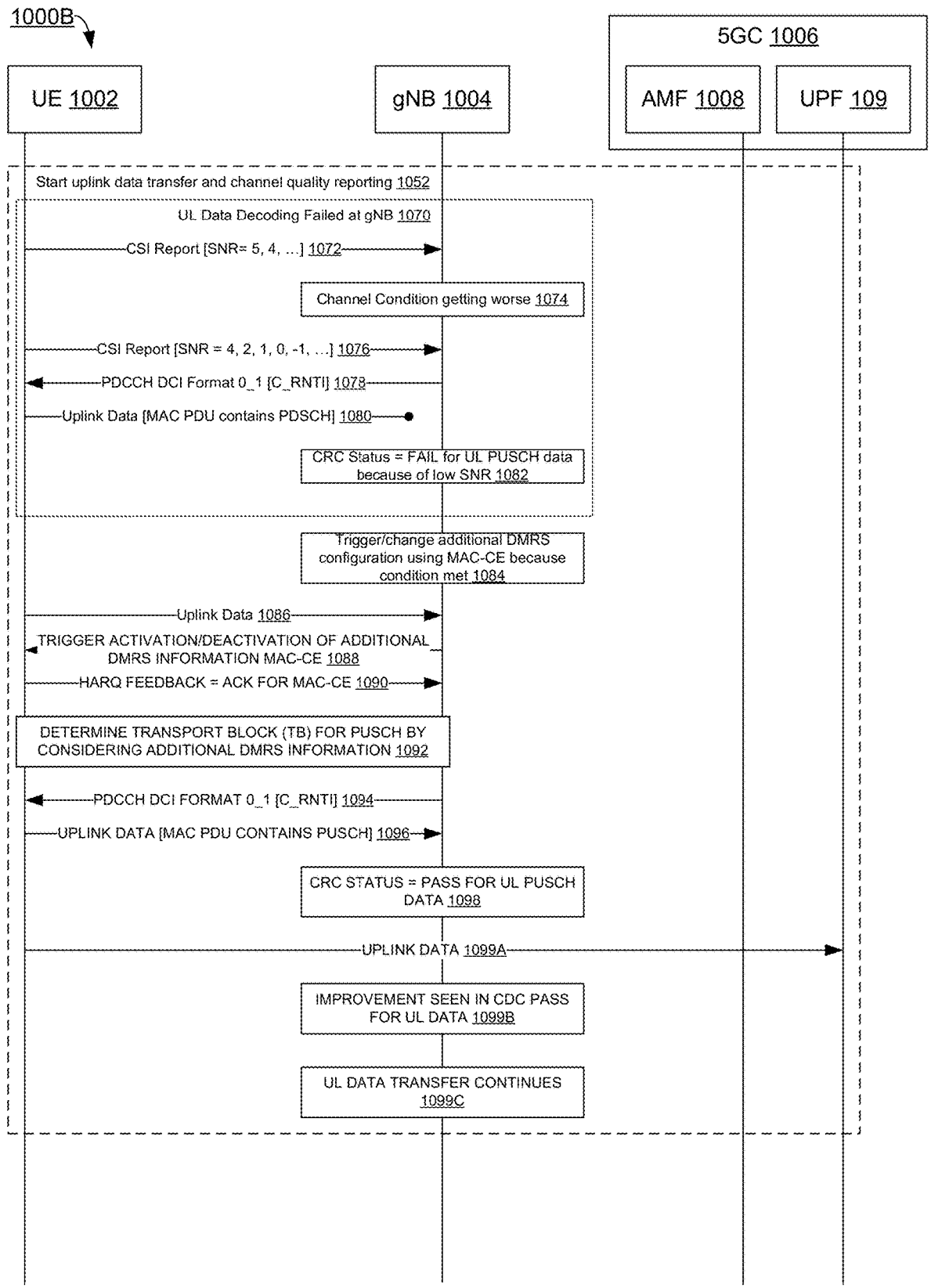

FIG. 10 illustrates an example signal flow for dynamic additional DMRS configuration for a uplink, and that can facilitate dynamic additional DMRS configuration in accordance with an embodiment of this disclosure.

As depicted, in signal flow 1000, communications are sent between user equipment 1002, gNB 1004, and 5GC 1006 (which comprises AMF 1008 and UPF 1010).

The signal flow of signal flow 1000 is an example signal flow, and there can be signal flows that implement different signals, or the signals of signal flow 1000 in a different order, as part of facilitating dynamic additional DMRS configuration. As depicted in signal flow 1000, the following occurs:

5G-NR RRC connection setup 1012
Msg1:Preamble 1014
Allocate temporary C-RNTI 1016
PDCCH DCI Format 1_0 [RA_RNTI] 1018
Msg2:Random Access Response 1020
Msg3:RRCSetupRequest 1022
PDCCH DCI Format 1_0 [C_RNTI] 1024
Msg4:RRCSetup 1026, where a dynamicAdditionalDmrsSupport[TRUE/FALSE] IE is contained in this message, and can be added as part of the present techniques
PDCCH DCI Format 0_0 [C_RNTI] 1028
RRCSetupComplete 1030
AMF Selection 1032
Initial UE message [NAS-PDU:Registration Request] 1034
NAS Identity Request/Response 1036
NAS Authentication Request/Response 1038
NAS Security Mode Command/Complete 1040
UE capability enquiry 1041A
UE capability information, with dynamicAdditionalDmrsSupport[Supported] IE in FeatureSetUplink 1041B
Initial Context Setup Request [NAS-PDU:Registration Accept] 1042
RRCReconfiguration with dynamicAdditionalDmrsSupport=TRUE in PUSCH-Config IE where UE supports this feature in uplink 1044
RRCReconfigurationComplete 1046
Initial Context Setup Response 1048
SA UE attach procedure completed 1050
Start uplink data transfer and channel quality reporting 1052
Uplink data 1054
Uplink data 1056
PDCCH DCI Format 0_1 [C_RNTI] 1058
Uplink Data [MAC PDU contains PDSCH] 1060
CRC status=PASS for UL PUSCH data 1062
Uplink data 1064
Uplink data 1066
CSI Report [SNR>=10] 1068
UL data decoding failed at gNB 1070
CSI Report [SNR=5, 4, . . . ] 1072
Channel condition getting worse 1074
CSI Report [SNR=4, 2, 1, 0, −1, . . . ] 1076
PDCCH DCI Format 0_1 [C_RNTI] 1078
Uplink Data [MAC PDU contains PUSCH] 1080
CRC Status=FAIL for UL PUSCH because of low SNR 1082
Trigger/change additional DMRS configuration using MAC-CE because of a condition 1084, where, in some examples, a condition can be UL SNR reporting is bad for a certain threshold and period; UL CRC fails because SNR is low (e.g., BLER is high for a certain threshold and period); UE is on a cell edge; and/or UE is on high mobility
Uplink data 1086
Trigger activation/deactivation of additional DMRS information MAC-CE 1088
HARQ Feedback=ACK for MAC-CE 1090
Determine transport block (TB) for PUSCH by considering additional DMRS information 1092
PDCCH DCI Format 0_1 [C_RNTI] 1094
Uplink Data [MAC PDU contains PUSCH] 1096
CRC Status=PASS for UL PUSCH data 1098
Uplink data 1099A
Improvement seen in CDC PASS for UL Data 1099B
UL Data transfer continues 1099C

Figure 9A:
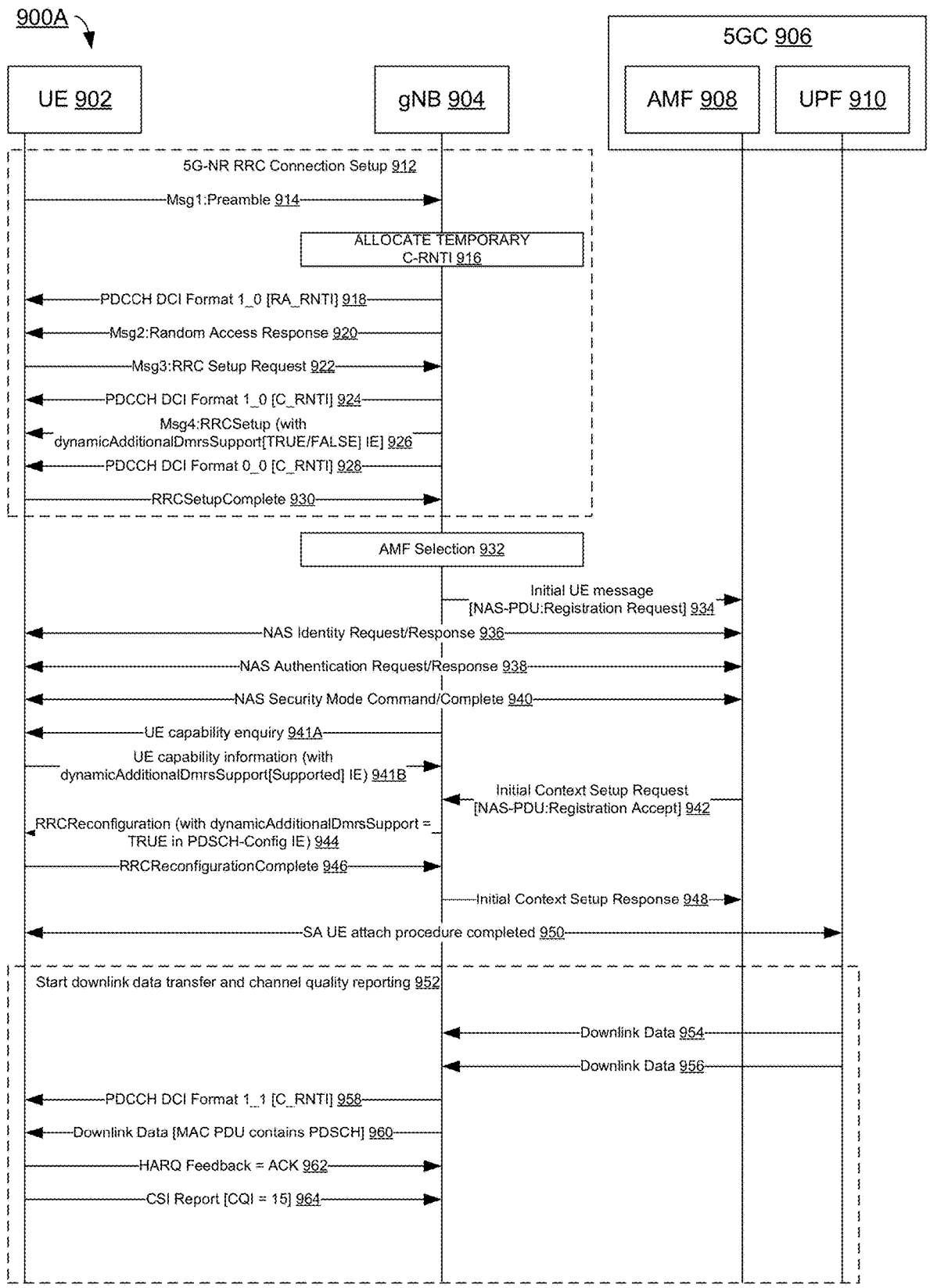
FIGS. 9A and 9B illustrate an example signal flow for dynamic additional DMRS configuration for a downlink, and that can facilitate dynamic additional DMRS configuration in accordance with an embodiment of this disclosure.
Figure 9B:
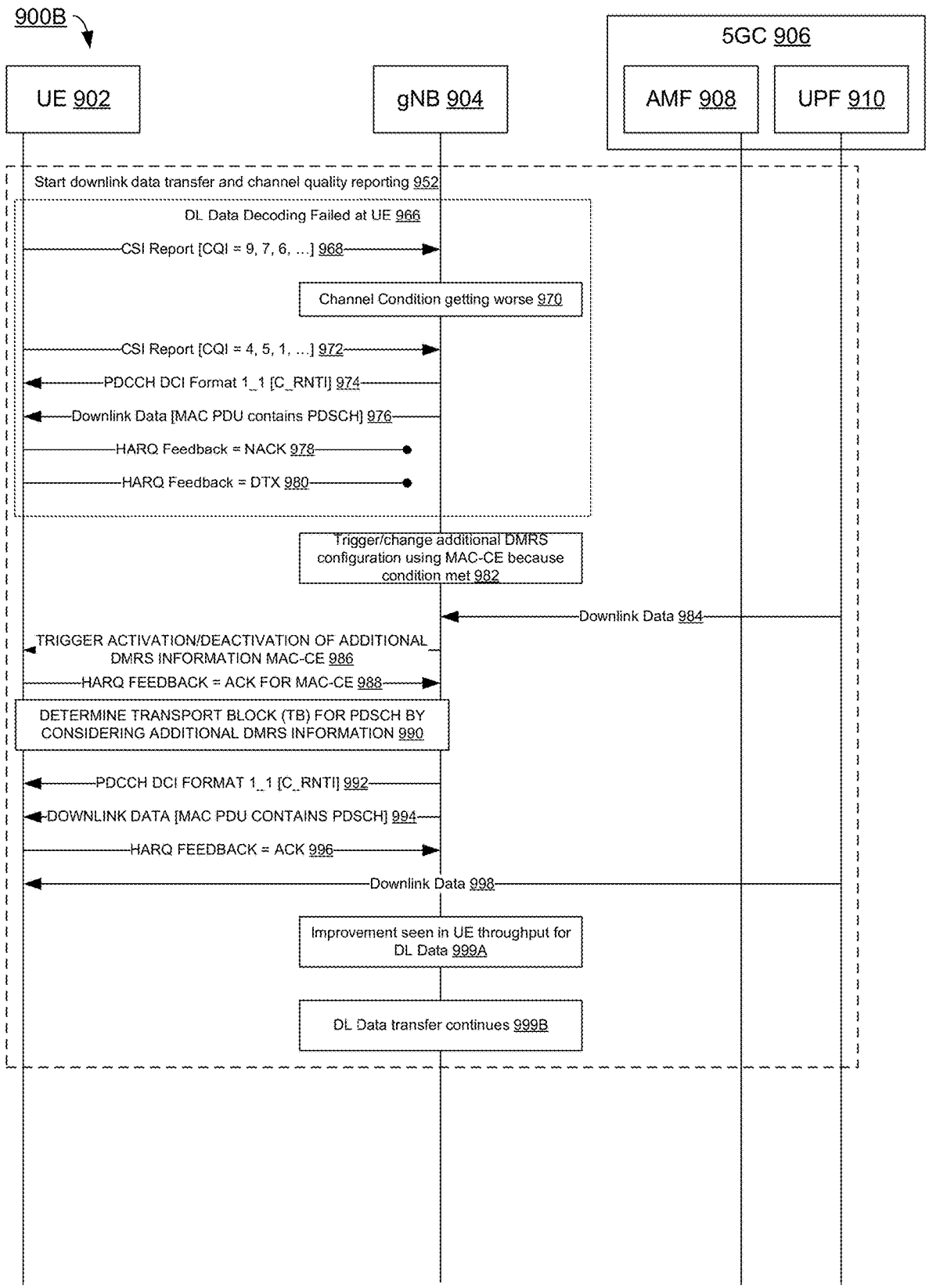

User equipment 1002, gNB 1004, 5GC 1006, AMF 1008, and UPF 1010 can be similar to user equipment 902, gNB 904, 5GC 906, AMF 908, and UPF 910 of FIGS. 9A and 9B, respectively. Signals 1012-1050 can be similar to signals 912-950. Additionally, in signals 1012-1050, an IE dynamicAdditionalDmrsSupport can be available for downlink, and an uplink structure can be different relative to signals 912-950 of FIG. 9A.

Example Process Flows

FIG. 11 illustrates an example process flow 1100 that can facilitate dynamic additional DMRS configuration, in accordance with an embodiment of this disclosure. In some examples, one or more embodiments of process flow 1100 can be implemented by gNB 904 of FIGS. 9A and 9B, gNB 1004 of FIGS. 10A and 10B, and/or computing environment 1400 of FIG. 14.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1200 of FIG. 12, and/or process flow 1300 of FIG. 13.

Process flow 1100 begins with 1102, and moves to operation 1104.

Operation 1104 depicts configuring a first number of demodulation reference signal positions in radio resource control information as part of a connection setup with a user equipment that is configured to facilitate first broadband cellular communications. This can comprise a gNB (e.g., gNB 904 of FIGS. 9A and 9B) establishing a connection setup with user equipment (e.g., UE 902 of FIGS. 9A and 9B), where the connection setup can be similar to NR RRC connection setup 912 and/or NR RRC connection setup 1012. The first number of additional demodulation reference signal positions can be the number that are established as part of an attach procedure.

In some examples, operation 1104 comprises, as part of the attaching the user equipment, sending, to the user equipment, a radio resource control setup message that indicates support of modification of the first number of demodulation reference signal positions after attaching. In some examples, this radio resource control setup message can be similar to Msg4:RRCSetup 926, where a dynamicAdditionalDmrsSupport[TRUE/FALSE] IE is contained in this message, and can be added as part of the present techniques of FIG. 9A, and/or Msg4:RRCSetup 1026, where a dynamicAdditionalDmrsSupport[TRUE/FALSE] IE is contained in this message, and can be added as part of the present techniques of FIG. 10A.

In some examples, an information element of the radio resource control setup message indicates support of the modification of the first number of demodulation reference signal positions after attaching. That is, within the radio resource control message, a dynamicAdditionalDmrsSupport[TRUE/FALSE] IE can be contained, which indicates whether the base station supports dynamic modification of demodulation reference signal positions.

After operation 1104, process flow 1100 moves to operation 1106.

Operation 1106 depicts, after attaching the user equipment, sending, to the user equipment, a medium access control control element message indicative of modifying the first number of demodulation reference signal positions to a second number of demodulation reference signal positions. In some examples, this message can be similar to trigger activation/deactivation of additional DMRS information MAC-CE 986 of FIG. 9B (in a case of downlink communications), and/or trigger activation/deactivation of additional DMRS information MAC-CE 1088 (in a case of uplink communications). The MAC-CE message can be similar in structure to that depicted with respect to FIG. 8.

In some examples, operation 1106 comprises, in response to sending, to the user equipment, the medium access control control element message, receiving, from the user equipment, a hybrid automatic repeat request message that acknowledges the medium access control control element message. In some examples, this hybrid automatic repeat request message can be similar to HARQ Feedback=ACK for MAC-CE 988 of FIG. 9B, and/or HARQ Feedback=ACK for MAC-CE 1090 of FIG. 10B.

In some examples, the medium access control control element message indicates triggering activation of demodulation reference signal positions. In some examples, the medium access control control element message indicates triggering deactivation of demodulation reference signal positions. That is, a MAC-CE message can be used for both activating and deactivating additional DRMS positions.

In some examples, operation 1106 comprises before sending, to the user equipment, the medium access control control element message indicative of modifying the first number of demodulation reference signal positions, receiving, from the user equipment, a user equipment capability message that indicates support for modification of the first number of demodulation reference signal positions after attaching. In some examples, this user equipment capability message can be similar to UE capability information, with dynamicAdditionalDmrsSupport[Supported] IE in FeatureSetDownlink 941B of FIG. 9A, and/or UE capability information, with dynamicAdditionalDmrsSupport[Supported] IE in FeatureSetUplink 1041B of FIG. 10A.

In some examples, an information element of the user equipment capability message indicates the support for the modification of the first number of demodulation reference signal positions after attaching. That is, within the user equipment capability message, a dynamicAdditionalDmrsSupport[Supported] IE can be contained, which indicates whether the user equipment supports dynamic modification of demodulation reference signal positions.

In some examples, operation 1106 comprises, before sending, to the user equipment, the medium access control control element message indicative of modifying the first number of demodulation reference signal positions, sending, to the user equipment, a radio resource control reconfiguration message that indicates support of modification of the first number of demodulation reference signal positions after attaching. This radio resource control reconfiguration message can be similar to RRCReconfiguration with dynamicAdditionalDmrsSupport=TRUE in PDSCH-Config IE where UE supports this feature in downlink 944, and/or RRCReconfiguration with dynamicAdditionalDmrsSupport=TRUE in PUSCH-Config IE where UE supports this feature in uplink 1044.

This radio resource control reconfiguration message can indicate that the UE already supports a dynamic additional DMRS feature that is communicated by the UE in 941B or 1041B as part of UE capability information. Here, a gNB can add this IE in a RRCE Reconfiguration message.

In some examples, a physical downlink shared channel configuration information element of the radio resource control reconfiguration message indicates support of the modification of the first number of demodulation reference signal positions in downlink communications. That is, the IE can be similar to PDSCH-Config IE in RRCReconfiguration with dynamicAdditionalDmrsSupport=TRUE in PDSCH-Config IE where UE supports this feature in downlink 944.

In some examples, a physical uplink shared channel configuration information element of the radio resource control reconfiguration message indicates support of the modification of the first number of demodulation reference signal positions in uplink communications. That is, the IE can be similar to PUSCH-Config IE in RRCReconfiguration with dynamicAdditionalDmrsSupport=TRUE in PUSCH-Config IE where UE supports this feature in uplink 1044.

After operation 1106, process flow 1100 moves to operation 1108.

Operation 1108 depicts conducting second broadband cellular communications with the user equipment according to the second number of demodulation reference signal positions, wherein a throughput of the second broadband cellular communications is determined as a function of a size of a transport block set based on the second number of demodulation reference signal positions. This can comprise the gNB using the dynamically configured additional DMRS positions, such as in DL data transfer continues 999B of FIG. 9B (in a case of downlink communications), and/or UL data transfer continues 1099C of FIG. 10B (in a case of uplink communications).

After operation 1108, process flow 1100 moves to 1110, where process flow 1100 ends.

FIG. 12 illustrates an example process flow 1200 that can facilitate dynamic additional DMRS configuration, in accordance with an embodiment of this disclosure. In some examples, one or more embodiments of process flow 1200 can be implemented by gNB 904 of FIGS. 9A and 9B, gNB 1004 of FIGS. 10A and 10B, and/or computing environment 1400 of FIG. 14.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1100 of FIG. 11, and/or process flow 1300 of FIG. 13.

Process flow 1200 begins with 1202, and moves to operation 1204.

Operation 1204 depicts, after attaching a user equipment that is configured to facilitate first broadband cellular communications, sending and to the user equipment, a medium access control control element message indicative of a first number of demodulation reference signal positions that was established as part of a connection setup being modified to a second number of demodulation reference signal positions. In some examples, operation 1204 can be implemented in a similar manner as operations 1104-1106 of FIG. 11.

In some examples, the second number of demodulation reference signal positions is configured for uplink communications of the broadband cellular communications, and sending the message to the user equipment is performed in response to receiving uplink data from the user equipment. That is, the additional DMRS positions can be changed for uplink communications, and determining to change the additional DMRS positions can be made based on uplink data.

In some examples, the uplink data indicates that an uplink signal-to-noise ratio metric does not satisfy a threshold associated with a predetermined quality criterion for a defined amount of time, wherein a cyclic redundancy check that corresponds to the uplink data has failed or is failing, wherein the uplink data indicates that the system is connected to edge network equipment of a cellular network via which the broadband cellular communications are conducted, or wherein the uplink data indicates that the system satisfies a defined physical movement criterion.

After operation 1204, process flow 1200 moves to operation 1206.

Operation 1206 depicts conducting broadband cellular communications with the user equipment according to the second number of demodulation reference signal positions. In some examples, operation 1206 can be implemented in a similar manner as operation 1108 of FIG. 11.

After operation 1206, process flow 1200 moves to 1208, where process flow 1200 ends.

FIG. 13 illustrates an example process flow 1300 that can facilitate dynamic additional DMRS configuration, in accordance with an embodiment of this disclosure. In some examples, one or more embodiments of process flow 1300 can be implemented by gNB 904 of FIGS. 9A and 9B, gNB 1004 of FIGS. 10A and 10B, and/or computing environment 1400 of FIG. 14.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1100 of FIG. 11, and/or process flow 1200 of FIG. 12.

Process flow 1300 begins with 1302, and moves to operation 1304.

Operation 1304 depicts, after attaching a user equipment that is configured to facilitate first broadband cellular communications, sending, to the user equipment, a medium access control control element message indicative of a modified number of demodulation reference signal positions that was established as part of a connection setup. In some examples, operation 1304 can be implemented in a similar manner as operations 1104-1106 of FIG. 11.

In some examples, modifying the number of demodulation reference signal positions is performed for downlink communications of the broadband cellular communications, and wherein the sending, to the user equipment, the message is performed in response to receiving hybrid automatic feedback that indicates failure or a channel quality indicator reporting metric from the user equipment. Additional DMRS positions can be changed for downlink communications, and a determination to change additional DMRS positions can be based on this type of information from the user equipment. That is, when there is downlink data transmission and a gNB receives too many HARQ feedback failures (e.g., the gNB receives NACK or DTX messages), or low CQI reporting from a UE, it can mean that the UE is on cell edge, and the UE lacks sufficient power or signal conditions to send HARQ feedback as ACK.

In some examples, the CQI reporting metric does not satisfy a threshold associated with a defined threshold criterion for a defined amount of time. That is, CQI reporting can be bad for a defined threshold value and time period.

In some examples, the hybrid automatic feedback is being reported as a negative acknowledgement. That is, HARQ feedback can be reported as NACK.

In some examples, the hybrid automatic feedback is being reported as the negative acknowledgement based on a block error rate metric satisfying a threshold associated with a defined threshold criterion for a defined amount of time, that there is a connection to edge network equipment of a cellular network via which the first broadband cellular communications are conducted, or that a defined high mobility criterion is satisfied. That is, BLER can be high for a defined threshold value and time period; the UE can be located on cell edge; or the UE can be on high mobility.

After operation 1304, process flow 1300 moves to operation 1306.

Operation 1306 depicts conducting broadband cellular communications with the user equipment according to the modified number of demodulation reference signal positions. In some examples, operation 1306 can be implemented in a similar manner as operation 1108 of FIG. 11.

In some examples, the broadband cellular communications are second broadband cellular communications, modifying the number of demodulation reference signal positions comprises modifying the number of demodulation reference signal positions from a first number of demodulation reference signal positions to a second number of demodulation reference signal positions, and a second throughput of the second broadband cellular communications is less than a first throughput of a first broadband cellular communication that is conducted according to the first number of demodulation reference signal positions. That is, data throughput can be inversely proportional to a number of configured additional DMRS positions, where a larger number of additional DMRS symbols indicates a smaller data throughput.

After operation 1306, process flow 1300 moves to 1308, where process flow 1300 ends.

Example Operating Environment

Figure 14:
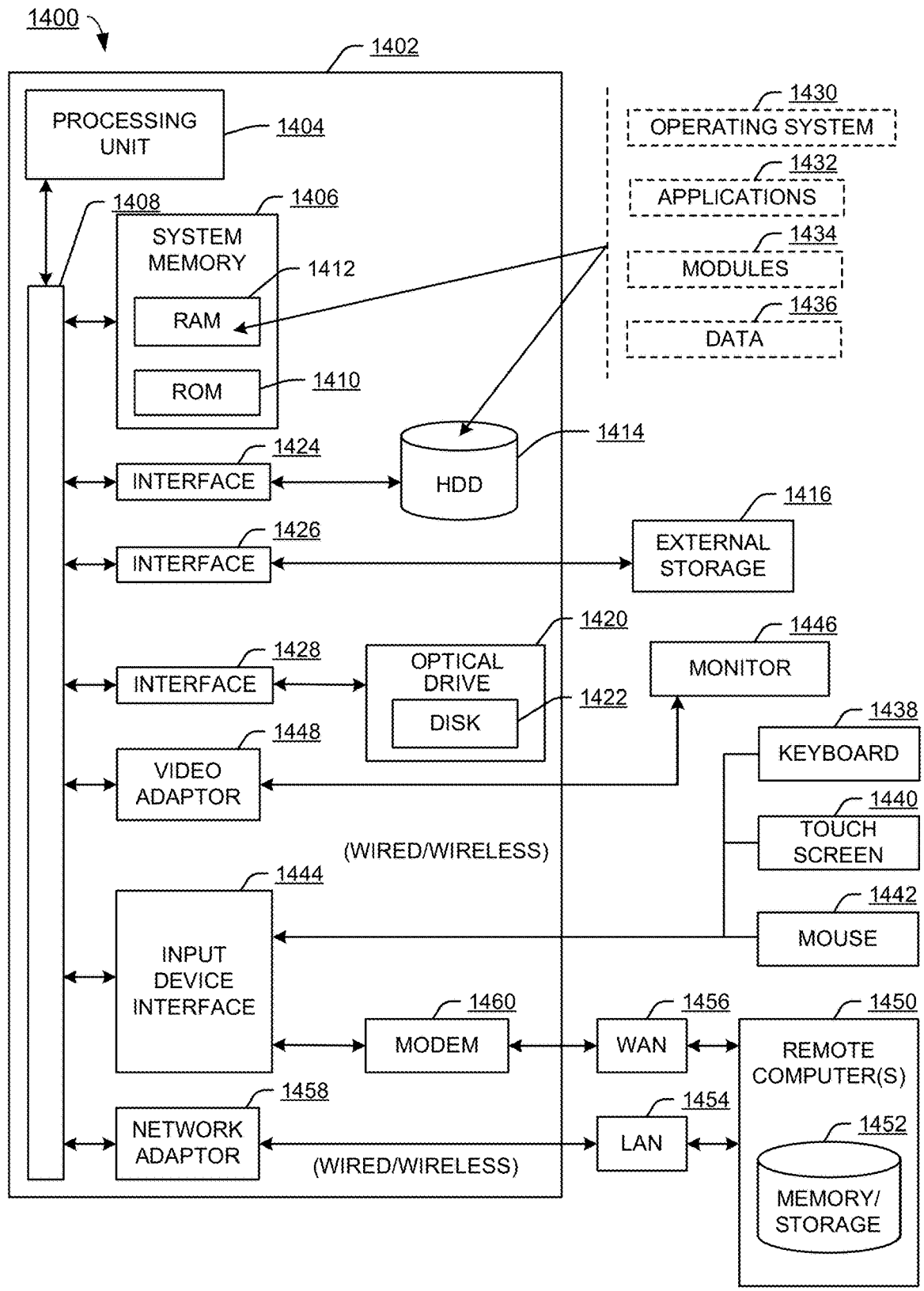
FIG. 14 illustrates an example block diagram of a computer operable to execute an embodiment of this disclosure.

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of dynamic additional DMRS configuration component 310 of FIGS. 3A and 3B; dynamic additional DMRS configuration component 410 of FIGS. 4A and 4B; dynamic additional DMRS configuration component 510 of FIGS. 5A and 5B; dynamic additional DMRS configuration component 610 of FIGS. 6A and 6B; gNB 702 and/or UE 704 of FIG. 7; UE 902, gNB 904, and/or 5GC 906 of FIGS. 9A and 9B; and/or UE 1002, gNB 1004, and/or 5GC 1006 of FIGS. 10A and 10B.

In some examples, computing environment 1400 can implement one or more embodiments of the process flows of FIGS. 11-13 to facilitate dynamic additional DMRS configuration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the at least one processor, comprising instructions that cause the at least one processor to perform operations comprising:
   configuring a first number of demodulation reference signal positions in radio resource control information as part of attaching to a user equipment that is configured to facilitate first broadband cellular communications;
   as part of the attaching to the user equipment, sending, to the user equipment and via an antenna, a message that comprises a first value that indicates that the system is able to support modification of the first number of demodulation reference signal positions after the attaching to the system, wherein the message is configured to comprise a second value that indicates that the system is not able to support modification of the first number of demodulation reference signal positions after the attaching to the user equipment;
   after attaching to the user equipment, sending, to the user equipment, a medium access control control element message indicative of modifying the first number of demodulation reference signal positions to a second number of demodulation reference signal positions; and
   conducting second broadband cellular communications with the user equipment according to the second number of demodulation reference signal positions, wherein a throughput of the second broadband cellular communications is determined as a function of a size of a transport block set based on the second number of demodulation reference signal positions.

2. The system of claim 1, wherein the operations further comprise:
   in response to sending, to the user equipment, the medium access control control element message, receiving, from the user equipment, a hybrid automatic repeat request message that acknowledges the medium access control control element message.

3. The system of claim 1, wherein the medium access control control element message indicates triggering activation of demodulation reference signal positions.

4. The system of claim 1, wherein the medium access control control element message indicates triggering deactivation of demodulation reference signal positions.

5. The system of claim 1, wherein the message further comprises a radio resource control setup message that indicates support of modification of the first number of demodulation reference signal positions after attaching.

6. The system of claim 5, wherein an information element of the radio resource control setup message indicates support of the modification of the first number of demodulation reference signal positions after attaching.

7. The system of claim 1, wherein the operations further comprise:
   before sending, to the user equipment, the medium access control control element message indicative of modifying the first number of demodulation reference signal positions, receiving, from the user equipment, a user equipment capability message that indicates support for modification of the first number of demodulation reference signal positions after attaching.

8. The system of claim 7, wherein an information element of the user equipment capability message indicates the support for the modification of the first number of demodulation reference signal positions after attaching.

9. The system of claim 1, wherein the message further comprises a radio resource control reconfiguration message that indicates support of modification of the first number of demodulation reference signal positions after attaching.

10. The system of claim 9, wherein a physical downlink shared channel configuration information element of the radio resource control reconfiguration message indicates support of the modification of the first number of demodulation reference signal positions in downlink communications.

11. The system of claim 9, wherein a physical uplink shared channel configuration information element of the radio resource control reconfiguration message indicates support of the modification of the first number of demodulation reference signal positions in uplink communications.

12. A method, comprising:
   as part of attaching to a user equipment that is configured to facilitate broadband cellular communications, sending, via an antenna of a system comprising at least one processor and to the user equipment, a message that comprises a first value that indicates that the system is able to support modification of the first number of demodulation reference signal positions after the attaching to the system, wherein the message is configured to comprise a second value that indicates that the system is not able to support modification of the first number of demodulation reference signal positions after the attaching to the user equipment;
   after attaching to the user equipment, sending, by the system and to the user equipment, a medium access control control element message indicative of a first number of demodulation reference signal positions that was established as part of a connection setup being modified to a second number of demodulation reference signal positions; and
   conducting, by the system, the broadband cellular communications with the user equipment according to the second number of demodulation reference signal positions.

13. The method of claim 12, wherein the second number of demodulation reference signal positions is configured for uplink communications of the broadband cellular communications, and wherein the sending of the message to the user equipment is performed in response to receiving uplink data from the user equipment.

14. The method of claim 13, wherein the uplink data indicates that an uplink signal-to-noise ratio metric does not satisfy a threshold associated with a predetermined quality criterion for a defined amount of time, wherein a cyclic redundancy check that corresponds to the uplink data has failed or is failing, wherein the uplink data indicates that the system is connected to edge network equipment of a cellular network via which the broadband cellular communications are conducted, or wherein the uplink data indicates that the system satisfies a defined physical movement criterion.

15. A non-transitory computer-readable medium comprising instructions that, in response to execution, cause a system comprising at least one processor to perform operations, comprising:
- as part of attaching to a user equipment that is configured to facilitate broadband cellular communications, sending, via an antenna and to the user equipment, a message that comprises a first value that indicates that the system is able to support modification of the first number of demodulation reference signal positions after the attaching to the system, wherein the message is configured to comprise a second value that indicates that the system is not able to support modification of the first number of demodulation reference signal positions after the attaching to the user equipment;
- after attaching to the user equipment, sending, to the user equipment, a medium access control control element message indicative of a modified number of demodulation reference signal positions that was established as part of a connection setup; and
- conducting the broadband cellular communications with the user equipment according to the modified number of demodulation reference signal positions.

16. The non-transitory computer-readable medium of claim 15, wherein modifying the number of demodulation reference signal positions is performed for downlink communications of the broadband cellular communications, and wherein the sending of the message to the user equipment is performed in response to receiving hybrid automatic feedback that indicates failure or a channel quality indicator reporting metric from the user equipment.

17. The non-transitory computer-readable medium of claim 16, wherein the channel quality indicator reporting metric does not satisfy a threshold associated with a defined threshold criterion for a defined amount of time.

18. The non-transitory computer-readable medium of claim 16, wherein the hybrid automatic feedback is being reported as a negative acknowledgement.

19. The non-transitory computer-readable medium of claim 18, wherein the hybrid automatic feedback is being reported as the negative acknowledgement based on a block error rate metric satisfying a threshold associated with a defined threshold criterion for a defined amount of time, that there is a connection to edge network equipment of a cellular network via which the first broadband cellular communications are conducted, or that a defined high mobility criterion is satisfied.

20. The non-transitory computer-readable medium of claim 15, wherein the broadband cellular communications are second broadband cellular communications, wherein modifying the number of demodulation reference signal positions comprises modifying the number of demodulation reference signal positions from a first number of demodulation reference signal positions to a second number of demodulation reference signal positions, and wherein a second throughput of the second broadband cellular communications is less than a first throughput of a first broadband cellular communication that is conducted according to the first number of demodulation reference signal positions.

* * * * *